Oct. 26, 1971 — O. M. ULBING — 3,614,944

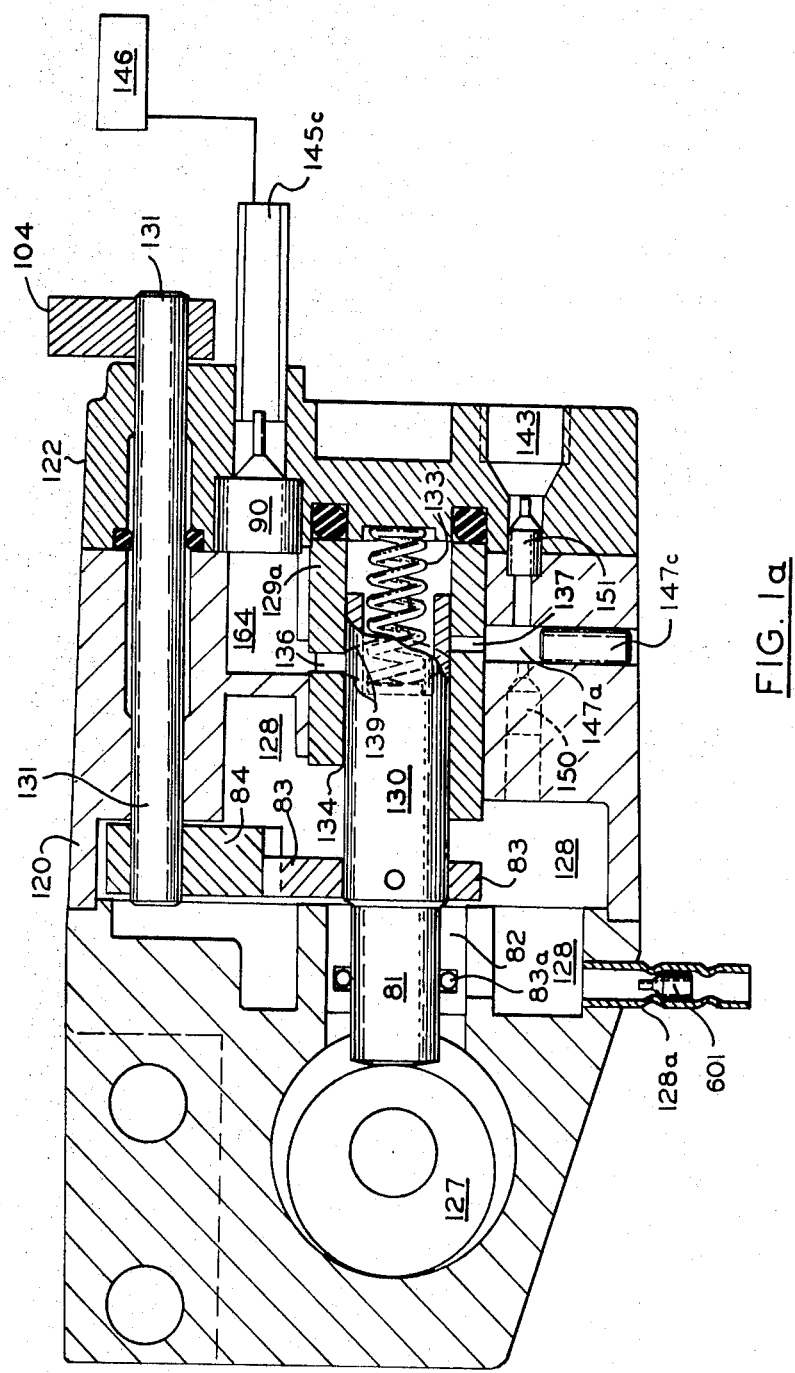

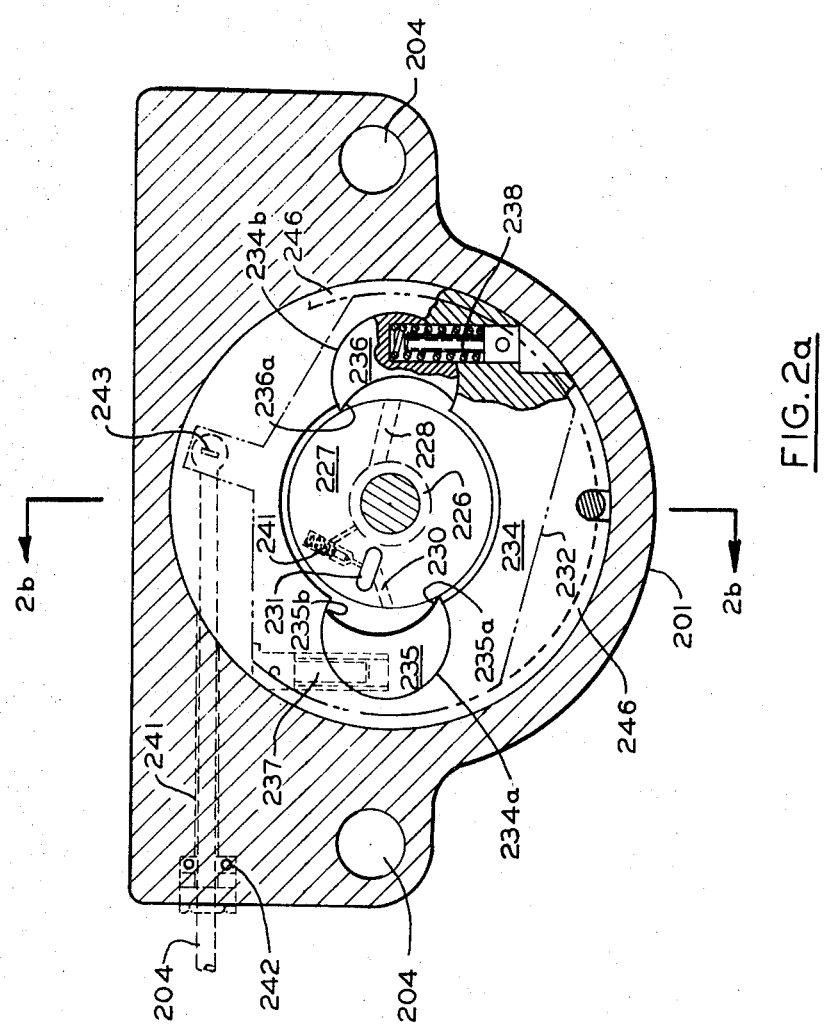

ENGINE APPARATUS

Filed Sept. 11, 1969 — 10 Sheets-Sheet 5

Oct. 26, 1971       O. M. ULBING      3,614,944
ENGINE APPARATUS
Filed Sept. 11, 1969      10 Sheets-Sheet 6
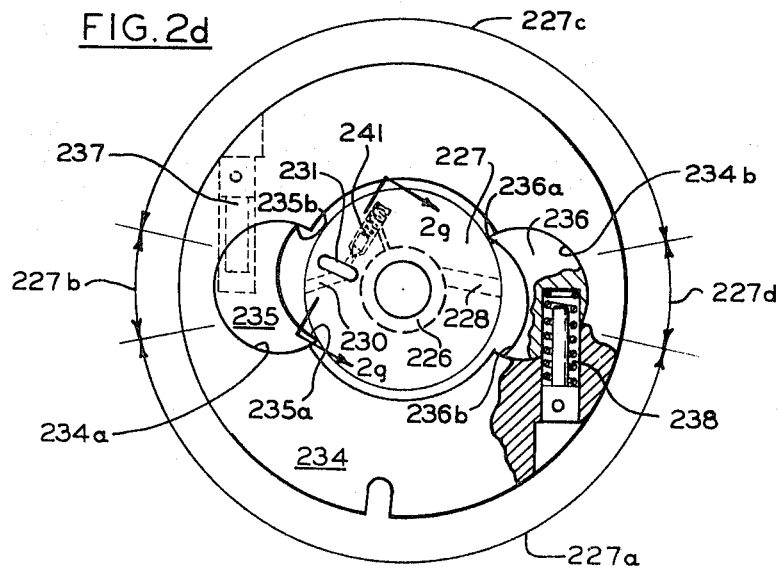
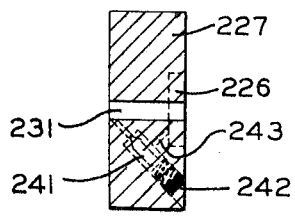
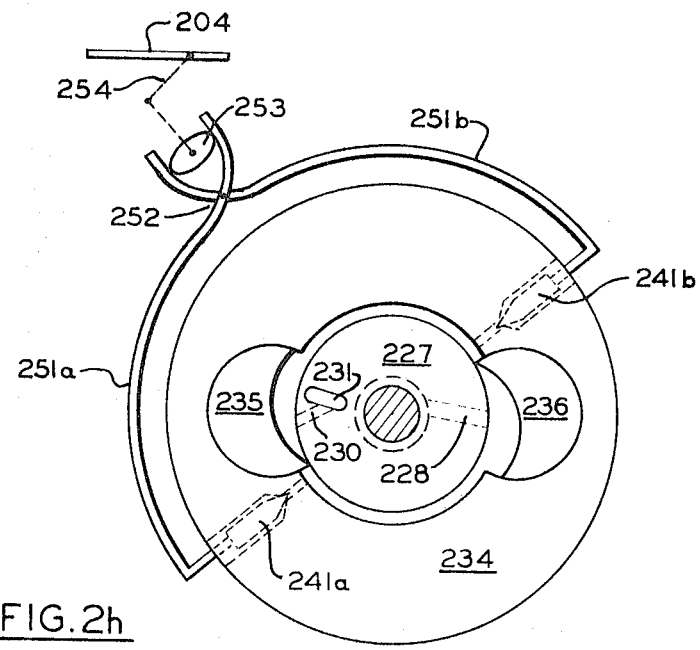

Oct. 26, 1971     O. M. ULBING     3,614,944
ENGINE APPARATUS

Filed Sept. 11, 1969     10 Sheets-Sheet 9

United States Patent Office 3,614,944
Patented Oct. 26, 1971

3,614,944
ENGINE APPARATUS
Otmar M. Ulbing, Lisle, N.Y., assignor to Ord
Systems Ltd., Port Crane, N.Y.
Continuation-in-part of application Ser. No. 786,233,
Dec. 23, 1968. This application Sept. 11, 1969,
Ser. No. 857,162
Int. Cl. F02m 39/00
U.S. Cl. 123—139 AY                    31 Claims

ABSTRACT OF THE DISCLOSURE

The fuel-per-stroke which fuel injection systems deliver to an engine is varied in accordance with engine speed to provide a desired fuel-air mixture ratio by means of a spring-loaded check valve responsive to momentary pressure impulses occurring in a pump chamber and operative to divert increasing fuel at increasing engine speeds. The check valve spring loading is varied simultaneously with the pump delivery setting in some embodiments, and valve operation is varied in accordance with engine speed and/or acceleration in some embodiments. The system is illustrated in connection with several reciprocating fuel-injection pumps and several rotary fuel-injection pumps.

This application is a continuation-in-part of my co-pending application Ser. No. 786,233, filed Dec. 23, 1968 and relates to improvements to the apparatus shown therein. Certain principles and aspects of the present invention are readily applicable, moreover, to internal combustion engine fuel systems other than those shown in my prior application.

It is desirable, after starting, and during normal "warmed up" operation, that the fuel-to-air ratio of the mixture burned by an engine either remain relatively constant or vary slightly in a desired sense over a wide range of speed and load conditions. It is generally preferred that the ratio either remain constant or vary slightly inversely with engine speed. Most internal combustion engines are controlled by a "primary control" which operates basically to control engine torque. In most carburetor-equipped engines the engine primary control controls torque by adjusting a throttle plate to adjust the amount of fuel-air mixture aspirated into an engine cylinder during a stroke. The amount of mixture aspirated per stroke determines the amount of air drawn into the carburetor air intake per stroke, and because of the venturi principle upon which the carburetor operates, the amount of fuel mixed with air varies proportionally. Because carburetor air flow inherently controls carburetor fuel flow, the fuel-to-air ratio of the mixture inherently tends to remain somewhat constant over a wide range of engine speeds. Any unwanted variation can be corrected easily in a number of ways, such as by use of a metering needle valve moved in response to engine vacuum.

While fuel injection engine systems have a number of advantages over carburetor-equipped engine systems for a number of applications, fuel injection systems do not have the above-described automatic mixture-maintaining tendency of carburetor systems. In fuel injection systems engine torque is usually controlled by simultaneous variation of the amount of fuel pumped per stroke and the amount of air aspirated per stroke, with the engine torque control linked to both vary the amount of fuel pumped per stroke and to vary a throttle plate in the air intake duct. When a decrease in engine load causes an increase in engine speed at a given torque control setting, the increased air flow causes an increased pressure drop across the air intake structure, decreasing the amount of air aspirated per stroke. With the amount of air aspirated per stroke decreased and the amount of fuel pumped per stroke remaining the same, it will be seen that the fuel-to-air ratio disadvantageously tends to increase as engine speed increases due to decreased load at a given torque control setting. While such a variation in fuel-air ratio is not regarded as a serious limitation in many applications, in certain other applications, and particularly in those where the engine frequently operates under widely-varying load conditions, it is desirable that fuel delivery vary inversely with engine speed, or directly with engine load, as well as with adjustment of the engine torque control, or "primary control." The variation of fuel delivery so as to maintain a desired fuel-to-air relationship may be termed "secondary control." It is a principal object of the invention to provide improved fuel injection systems having effective and reliable secondary control.

Secondary control, or automatic variation of fuel delivery with engine speed in order to keep the fuel-air mixture relatively constant, is known in the prior art in connection with diesel engines and certain gasoline engines which use fuel injection. One prior art system is shown in U.S. Pat. No. 3,443,554, for example. However, those prior art systems of which I am aware require a centrifugal governor and/or other very complex and expensive mechanisms in order to provide secondary control. A very important object of the invention is to provide secondary control using much simpler and more economical apparatus which is easily constructed and highly reliable. Use of the present invention allows one to replace extremely complex and expensive mechanisms with merely a spring-loaded check valve.

In some prior art fuel injection systems the maximum pressures developed in the injection pump during an engine cycle vary appreciably with both engine speed and the fuel delivery setting of the basic torque control, while the maximum pressure developed in various other systems varies substantially solely with engine speed and is substantially independent of the fuel delivery setting of the basic torque control. As will be seen below, secondary control of some systems may be obtained solely by use of a spring-loaded check valve having a constant spring load, and secondary control of the other prior systems may be obtained very simply by use of a spring-loaded check valve together with means for varying the spring load as a function of the fuel delivery setting of the basic torque control. Thus further objects of the invention are to provide effective secondary control for fuel injection systems of both types.

The basic principles of the present invention are readily applicable both to fuel injection systems used with four-cycle engines and those used with two-cycle engines, and readily applicable to both fuel injection systems used with a single cylinder and those used with multi-cylinder engines, including those having distributor arrangements to successively feed plural cylinders in a sequence, and further objects of the invention are to provide apparatus having such versatility.

Several basically-different types of variable-delivery reciprocating pumps are used in fuel injection systems, and another object of the invention is to provide secondary control arrangements which are useful with each of the different types of pumps. Several different types of variable-delivery rotary pumps are also used in fuel injection systems, and a further object of the invention is to provide a secondary control arrangement which may be used with one or more such pumps. The invention is applicable to any fuel-injection system in which a pulsating pump is used and/or in which a distributor is used, in such a manner that a peak pressure impulse varying in accordance with engine and pump speed occurs during a pumping cycle.

A further object of the invention is to provide a simple secondary control device which may also be arranged to act as an engine speed governor or limiter.

Yet another object of the invention is to provide a single secondary control device which also may be arranged to be responsive to engine acceleration and deceleration to vary the fuel-air ratio in a desired sense when the engine accelerates or decelerates.

Other objects of the invention will in part be obvious and will, in part, appear hereinafter.

The invention accordingly comprises the features of construction, combination of elements, and arrangement of parts, which wil be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1a shows a modification to the pump of FIG. 1 to provide a different type of oil pumping.

Figure 2B:
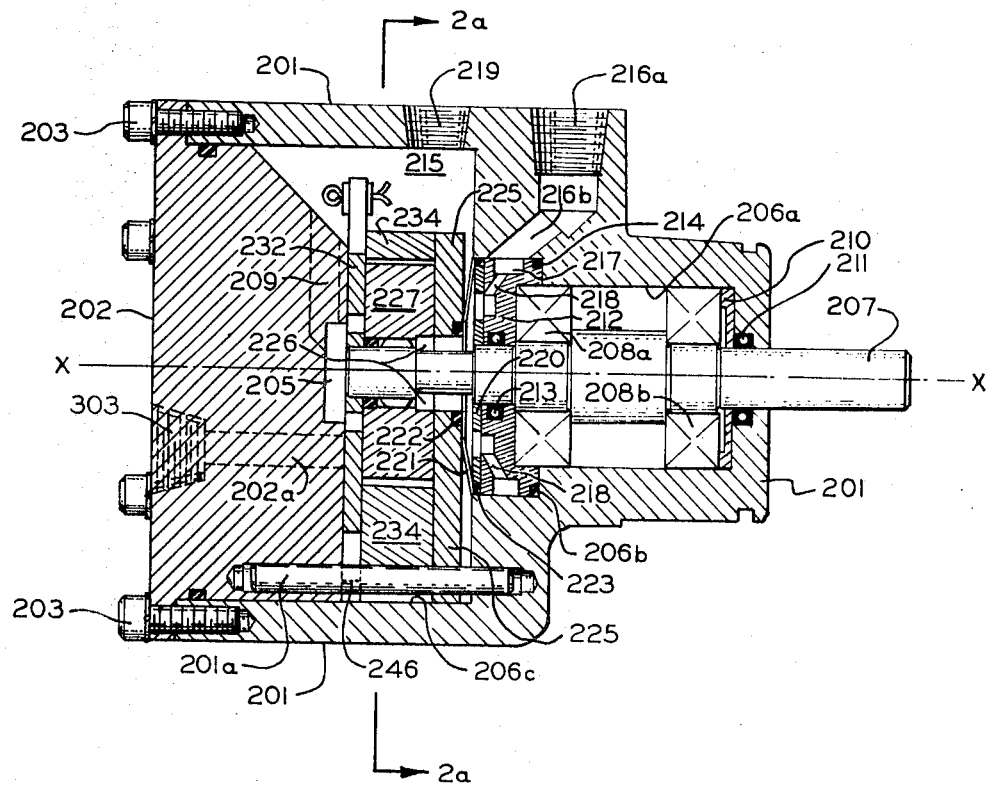

FIGS. 2a and 2b are cross-section views of a rotary variable-delivery distributing pump of a basic type shown in my prior U.S. Pat. No. 3,057,300 modified to incorporate secondary control in accordance with the present invention. FIG. 2a is a view taken at lines 2a—2a in FIG. 2b, and FIG. 2b is a view taken at lines 2b—2b in FIG. 2a.

Figure 2C:
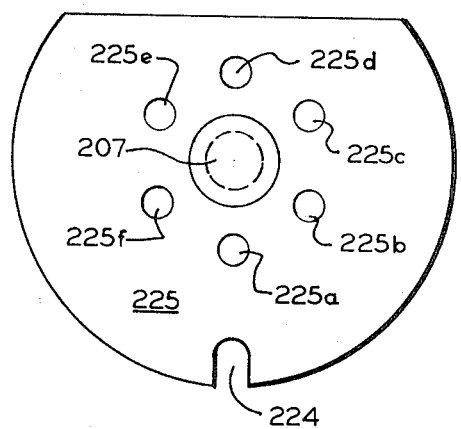

FIG. 2c is a view of one plate part of the apparatus of FIGS. 2a and 2b.

FIG. 2d is a view of a portion of FIG. 2a.

Figure 2F:
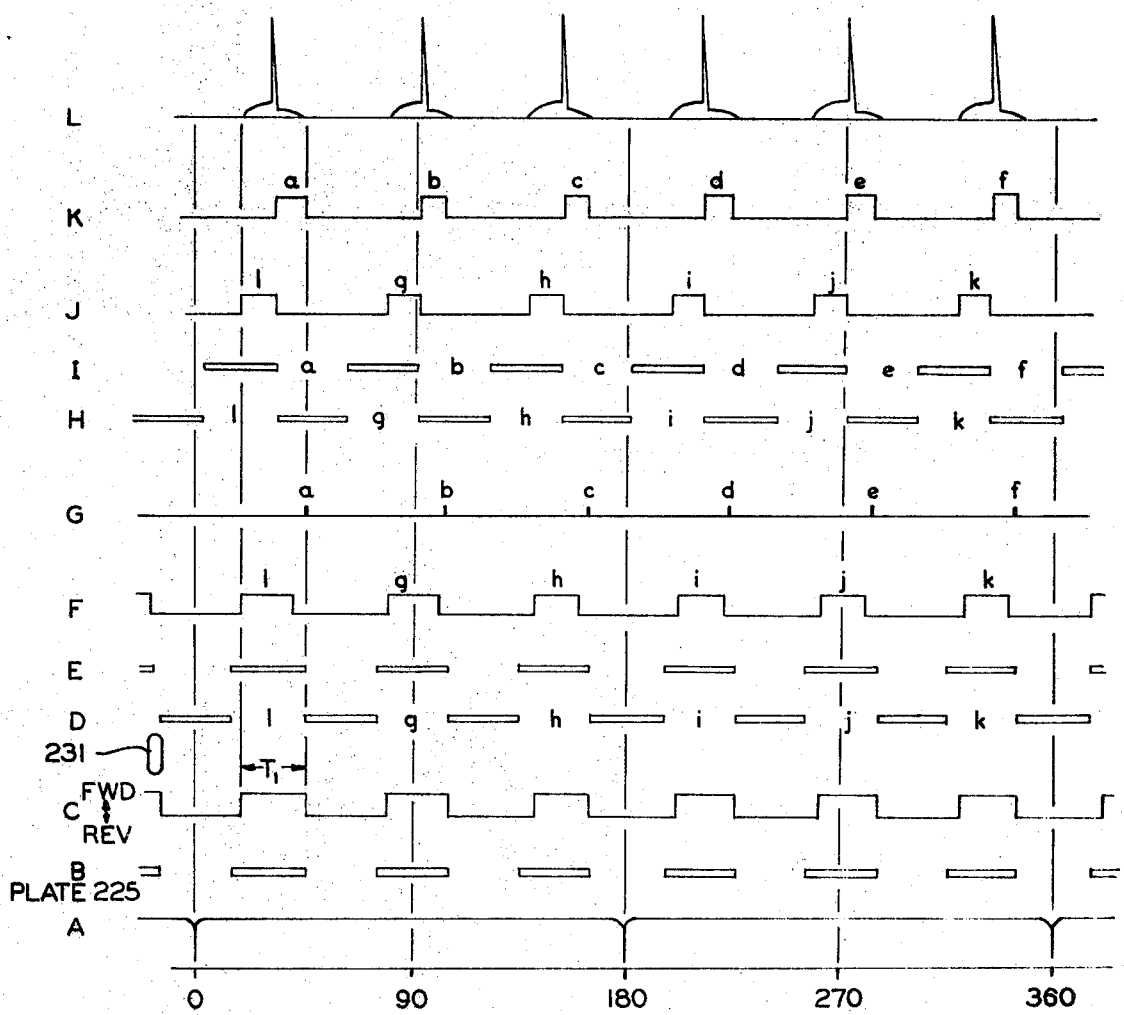
Figure 2E:
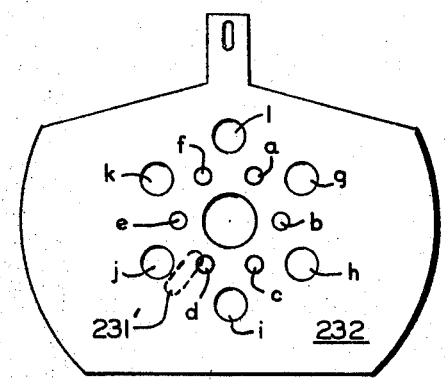

FIG. 2e is a view of an adjustable metering plate part of the apparatus of FIGS. 2a and 2b.

FIG. 2f is a timing diagram useful in understanding the operation of the apparatus of FIGS. 2a and 2b.

FIG. 2g is a cross-section view taken at lines 2g—2g in FIG. 2d.

FIG. 2h illustrates certain modifications which may be made to the device of FIGS. 2a and 2b.

Figure 3A:
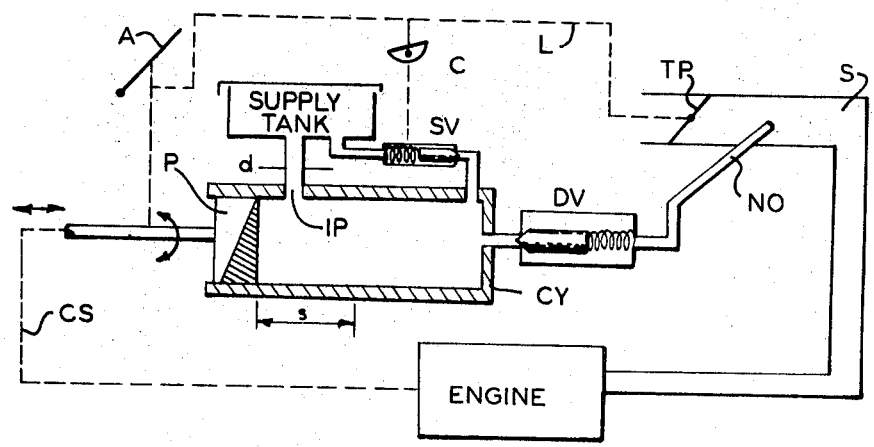
Figure 3B:
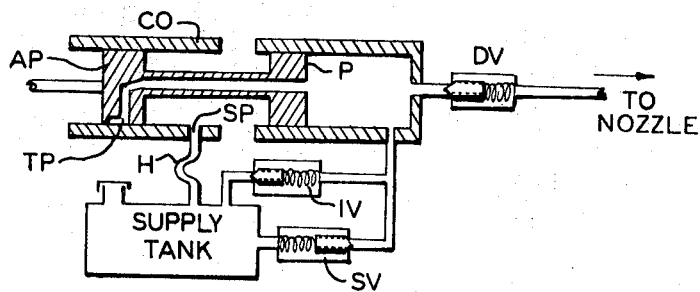
Figure 3C:
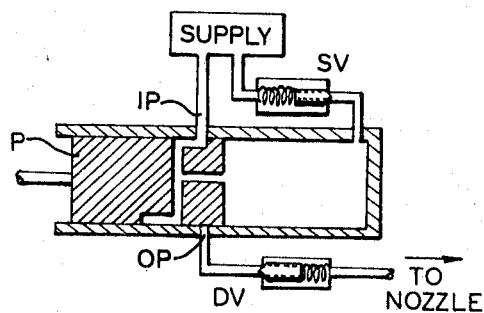

FIGS. 3a, 3b and 3c are diagrammatic views useful in explaining the operation of the invention with each of three different types of reciprocating, variable-delivery, constant stroke-length fuel injection pumps.

Figure 4:
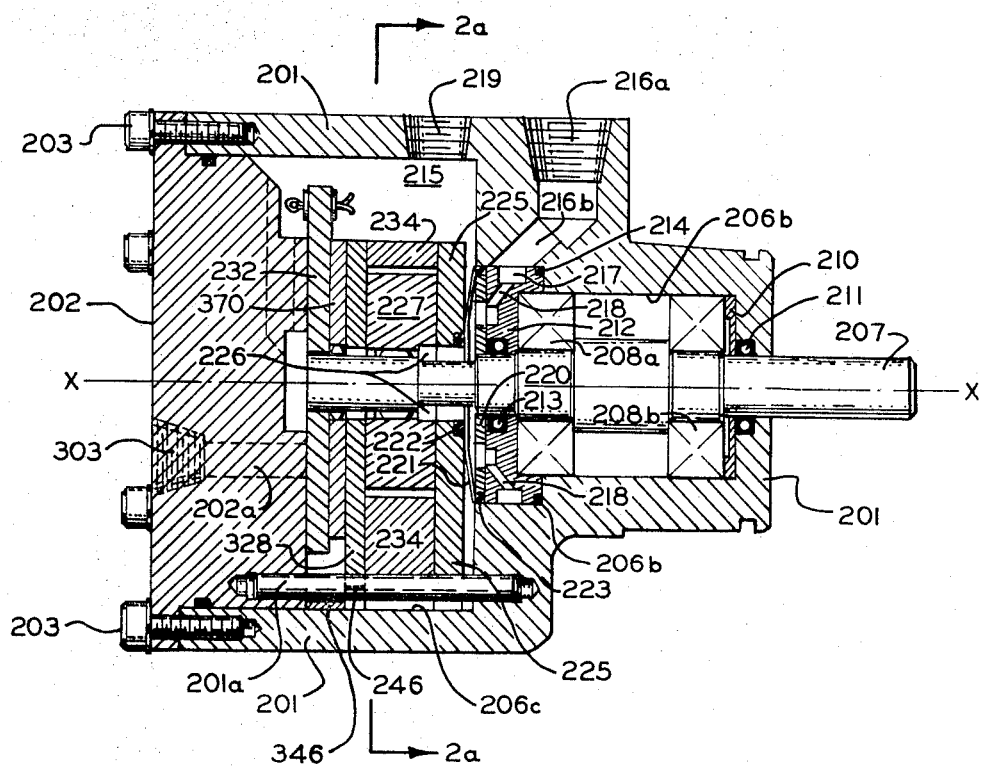

FIG. 4 is a cross-section view of a modified form of rotary variable-delivery fuel injection pump and distributor.

Figure 4A:
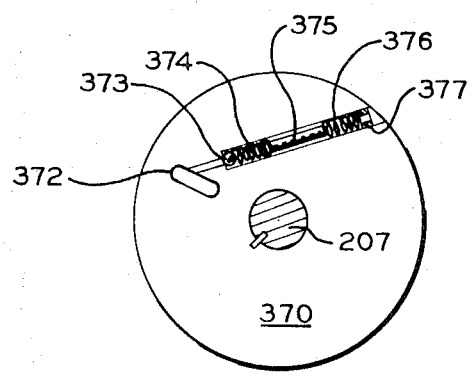

FIG. 4a is a view of a rotatable distributor plate of the device of FIG. 4.

Figure 5A:
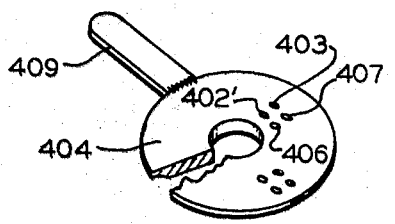
Figure 5A:
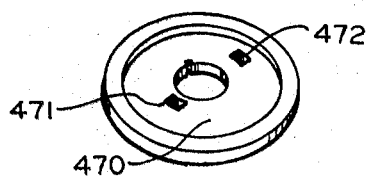
Figure 5A:
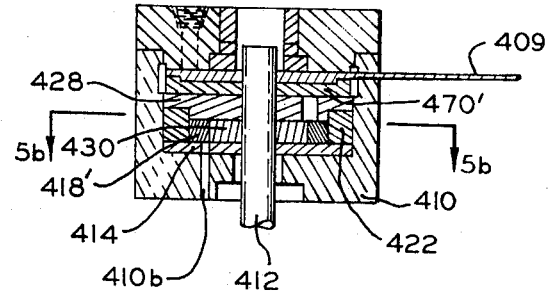
Figure 5C:
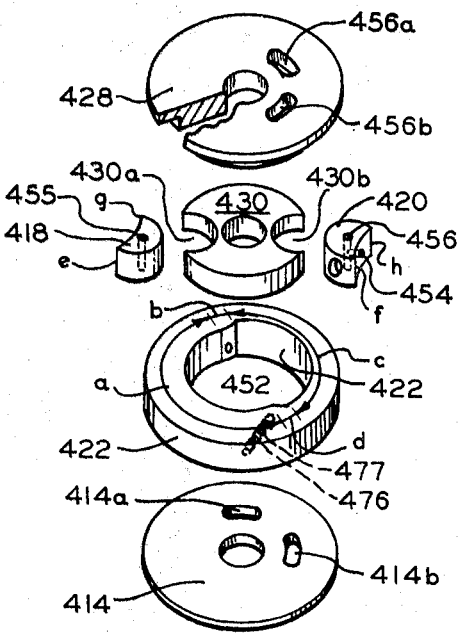
Figure 5B:
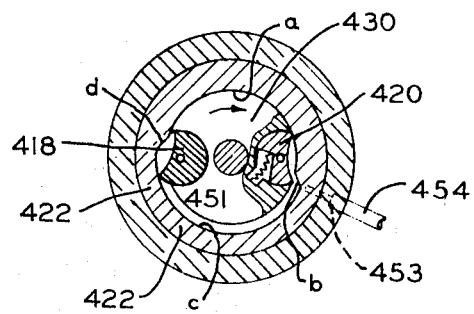

FIGS. 5a to 5c illustrate an alternative embodiment of the invention. FIG. 5a is a cross-section view through the pump, FIG. 5b is a view taken at lines 5b—5b in FIG. 5a, and FIG. 5c is an exploded view in which the parts are shown isometrically.

FIG. 3a diagrammatically illustrates the application of the invention to a well-known form of fuel injection system using a variable-delivery reciprocating pump in which delivery is varied by varying the time or point during the stroke at which an inlet port is closed off. The engine crankshaft is mechanically connected to reciprocate piston P a fixed stroke distance $s$ within cylinder CY. Piston P is provided with an axial length which varies angularly around the piston, so that rotating piston P to various angular positions will vary the time or position during each stroke at which the piston covers inlet port IP. If port IP is closed off early during the stroke, greater delivery will result. During a rightward pumping stroke, fuel will be expelled through inlet port IP back to the supply tank until the piston blocks the port, and forward pumping will occur through delivery check valve DV to nozzle NO after the piston blocks the port until the end of the stroke. The angular position of piston P is controlled by the engine primary control, which is shown as comprising an accelerator pedal A. The primary control also varies air intake throttle plate TP via a cam or suitable linkage L to generally increase air flow as fuel quantity is increased. At a given setting of the primary control, an increase in engine speed due to a decrease in load will decrease the amount of air aspirated per stroke due to the restriction of the air intake structure S, thereby undesirably increasing the fuel-air mixture ratio.

As piston P of the injection pump travels rightwardly on a pumping stroke from the leftward limit position shown in FIG. 3a, fluid will initially be expelled out inlet port IP. If piston velocity were uniform, the pressure within the cylinder during the initial travel would tend to be a constant value dependent upon piston speed and the restriction of unblocked port IP. If piston P is instead reciprocated with simple harmonic motion, or an approximation or modification thereof, as is usually the case in practical systems using cranks or eccentrics or the like, the linear velocity of the piston will instead vary approximately cosinusoidally, for example, from zero velocity at the leftward position shown to a maximum speed at mid-stroke, down to zero velocity at the end of the rightward stroke. The linear velocity, assuming simple harmonic motion, may be written as (taking mid-stroke as the origin):

$$v = s/2\omega \cos \omega t \quad (1)$$

With piston velocity increasing during the initial portion of the stroke, the flow Q through port IP will similarly increase in direct proportion. From Torricellli's theorem $(p = Q^2/A^2)$ it is evident that the pressure drop across the port, and hence the pressure within the cylinder, will vary as the square of the flow Q and vary inversely with the square of the area of the port, and hence the pressure will increase approximately in accordance with an $\omega^2(\cos \omega t)^2$ characteristic, where $\omega$ is engine speed in radians per second. Thus the pressure existing in the cylinder when the piston edge reaches the inlet port will be higher at higher engine speeds, varying approximately with the square of engine speed. If the area A of port IP is large, the pressure built up in the cylinder prior to closure of the inlet port will still be very modest, however, and in many systems is small enough to be neglected.

If at a given engine speed the piston is rotated to close off port IP later during the stroke, so as to provide lesser delivery per stroke, but still prior to midstroke, the piston will be seen to reach a greater linear velocity by the time it begins to close off port IP, and hence a greater pressure will exist when closure begins than at greater delivery settings. At any given engine speed, the maximum pressure would be developed if port IP is close off approximately at midstroke, when the piston is at its maximum linear velocity. If piston P is rotated to provide port closure very late during the stroke, a lesser peak pressure will be developed due to the lesser piston velocity at the time of closure. Prior art systems of the type shown in FIG. 3a did not include the further check valve SV, and its presence should be ignored for the moment.

As the piston begins to close off port IP, the pressure further increases, not only due to the increase in piston linear velocity and increase in flow (assuming port closure prior to midstroke) but also due to the decrease in unblocked port area irrespective of whether port closure occurs before or after midstroke. The pressure $p$ rises in the cylinder as the port is closed off oughly in accordance with the following characteristic:

$$p = \frac{k\omega^2 (\cos \omega t)^2}{\left[A_o - \dfrac{d}{k_1 \omega \cos \omega t}\right]^2} \quad (2)$$

where $A_o$ is the initial open area of the port, $d$ is the axial width of the port, and $k_1$ and $k$ are constants. As the port is gradually closed off it becomes an infinite restriction, and hence as the port is closed off the pressure rises exponentially, theoretically toward and infinite value. However, when the pressure reaches a value determined by the spring loading of delivery check value DV, the valve DV opens and the increase in pressure is thereafter limited. The rate at which the pressure rises as the port is closed off depends not only upon the geometry of the port, but also upon the piston speed. The increase in piston speed not only increases the pressure due to provision of increased flow, but also increases the rate of pressure increase by more quickly closing off the port, so that the rate of pressure increase varies as a fairly high power of engine speed. The precise slope of the pressure characteristic will also depend, of course, upon the shape of the inlet port as well as its general width, and the shape of the piston edge which passes over the port to block the port. As the piston is rotated to decrease the delivery per stroke at a given engine speed, so that the piston has a greater velocity when it closes off the port, the rate of pressure increase will be seen to increase. Since maximum linear piston velocity occurs at midstroke, the maximum peak pressure for any given engine speed will occur when the port is closed off approximately at midstroke, when the pump is adjusted to pump approximately one-half its maximum delivery per stroke.

The rapid increase in pressure as the port is closed off applies a sudden force to the body of valve DV, accelerating it rightwardly against the force of the valve spring and providing a damped oscillation of the valve body. The mass of the valve body, the valve spring, and the viscous resistance of the fuel to motion of the valve body after the valve is opened will be seen to provide a mass-spring-damper second order system. The valve body, eventually returns to a steady-state position such that cylinder pressure balances the valve spring loading, and cylinder pressure remains substantially at the value determined by the delivery valve spring loading for the remainder of the rightward pumpng stroke. The motion of the check valve body required to allow maximum flow through the check valve is assumed to be small compared with the length of the check valve spring, and hence the spring may be assumed to apply a substantially constant force to the check valve body. Because the pressure drops quickly when the delivery check valve opens, the force applied to the valve body has the nature of a brief impulse, the amplitude of which varies as an exponential function of engine speed. Thus increased engine speed increases the amount which the valve body overshoots. After the overshoot, the check valve maintains cylinder pressure substantially at a value determined by the check valve spring loading. The pressure in the cylinder may increase slightly up to midstroke as piston velocity increases and thereafter decrease somewhat as piston velocity decreases during the latter half of the rightward pumping stroke but no further sudden increase in pressure will occur during the pumping stroke. As mentioned above, the foregoing description of operation assumes that check valve SV is not present.

In accordance with the present invention, fuel delivery per stroke may be decreased with increasing engine speed by provision of the further second control check valve SV, which is responsive to pump cylinder pressure and operative to spill back increasing amounts of fuel to the supply as engine speed increases. The ratio between the mass of the body of a check valve to the spring force of the spring of the check valve may be termed the check valve "time constant." Secondary control check valve SV is provided with a smaller time constant than that of delivery check valve DV. As the closure of inlet port IP causes the rapid increase in cylinder pressure, the pressure is applied simultaneously to both the delivery check valve and the secondary control check valve. The pressure temporarily rises above the steady-state delivery valve pressure setting due to the greater inertia or longer time constant of the delivery check valve, which delays its opening. During that temporary high pressure condition the secondary control check valve SV opens, due to its lesser mass, despite its greater spring loading, and opening of valve SV spills back fuel to the supply tank and limits the pressure developed in the cylinder. The amount which valve SV opens will be seen also to depend upon the peak pressure developed in the cylinder. and hence upon engine speed. As well as improving mixture ratio by spilling back some fuel, the quick opening of secondary control valve SV also decreases the time width of the pressure impulse applied to delivery check valve DV, thereby decreasing the overshoot of valve DV.

The variation in volumetric efficiency, or air aspirated per stroke, with speed is ordinarily non-linear for most engines. Also, the variation of peak pump cylinder pressure with pump speed is non-linear, and the variation in the amount of fuel which a typical spring-loaded check valve will pass with a given pressure impulse applied to it is also non-linear. Furthermore, the peak pump cylinder pressure occurring at a given engine speed varies in accordance with fuel delivery setting, as described above. Because of these varying relationships, it is sometimes difficult to provide a desired fuel-air ratio characteristic over widely-varying load conditions if a fixed spring loading is used on the secondary control check valve. In accordance with a further feature of the invention, the loading on the secondary control check valve may be varied as a function of the primary control delivery setting, and in FIG. 3a cam C rotated by the primary control A is effective to vary the spring load on check valve SV.

If the piston in FIG. 3a is rotated to decrease fuel delivery by closing off the inlet port later during the first half of the stroke, the piston will have a greater velocity as it closes off the port, thereby increasing the slope of the pressure characteristic, as will be apparent from expression (2), and thereby providing greater impulses to open the secondary check valve SV. Piston velocity decreases during the latter half of the pumping stroke. Thus maximum peak pressure for a given engine speed is developed if the inlet port is closed approximately at midstroke, which results when the pump is operating at roughly one-half of its capacity. Most engine systems require fuel delivery which varies from none or some small amount up to a maximum required for normal running, although even greater delivery may be required for starting. Since minimum delivery requires inlet port closure very late in the stroke, a pump of the type shown in FIG. 3a ordinarily will operate over a range which varies from a minimum delivery condition involving port closure very near the end of the rightward stroke when piston velocity is low, up to a maximum delivery condition involving port closure much earlier during the stroke when piston velocity is greater. If the maximum fuel required by the engine during running conditions is no more than half the maximum pump capacity, it will be seen that the peak pump cylinder pressure developed at a given engine speed will vary directly, though not linearly, with the fuel delivery setting over the entire running range of the engine. Under such conditions, cam C will ordinarily provide a spring-loading to valve SV which generally increases as the delivery is increased. If the engine requires more fuel delivery than half the pump capacity so that inlet port closure must occur prior to midstroke, a plot of the peak pump pressure developed at a given engine speed versus pump delivery will be seen to slope downwardly at the highest delivery values. Under such an arrangement, cam C will ordinarily provide spring-loading which increases as delivery is increased up to a given delivery value, after which cam C will provide decreasing spring-loading as delivery is further increased.

FIG. 3b diagrammatically illustrates a different form of reciprocating variable-delivery constant stroke-length injection pump in which delivery is varied by varying the time during the stroke at which forward pumping is terminated, rather than varying the time at which it begins.

The pistons P and AP are reciprocated by the engine with some approximation of simple harmonic motion. As piston P travels rightwardly on a pumping stroke, delivery commences substantially immediately through delivery check valve DV, and continues throughout the rightward pumping stroke until port TP of auxiliary piston AP registers with port SP of collar CO, at which time fuel is spilled back through hose H to the supply tank. The delivery check valve feeds a nozzle extending into the engine air intake structure in the same manner as in FIG. 3a. The piston P contains a bore and a conduit communicating with port TP of auxiliary piston AP. Collar CO is arranged to be axially adjustable relative to auxiliary piston AP by means of the engine primary control, so that the time or position during the stroke at which forward pumping ceases may be varied to vary the quantity of fuel delivered. Inlet check valve IV admits fuel to the pump cylinder during the leftward return or suction stroke.

First consider the operation without the use of secondary control check valve SV. At the beginning of a rightward pumping stroke, piston speed begins at zero and increases cosinusoidally. Pressure builds up in the pump cylinder substantially immediately to a value greater than the steady-state spring loading of the delivery check valve, and then decreases to a value commensurate with the delivery check valve loading, as the delivery check valve DV opens. While the *velocity* of the piston P is minimum (zero) at the beginning of the stroke, the *acceleration* of the piston is then at its maximum value, and assuming simple harmonic motion: $a=s/2\omega^2 \sin \omega t$. The maximum acceleration of piston P applies a maximum impulse to delivery check valve DV, and the magnitude of the impulse will be seen to vary as the square of engine speed. As the delivery check valve opens, the pressure in the cylinder drops markedly. The pressure then increases somewhat until midstroke (assuming collar CO is adjusted to provide delivery past midstroke) due to the increasing velocity of the piston and increased flow through valve DV, but the pressure does not ordinarily approach the initial peak pressure. When port TP reaches port SP the pressure drops suddenly and delivery valve DV closes. Inasmuch as the peak pressure occurs at the beginning of the stroke, irrespective of the adjustment of collar CO, it will be seen that variation of the delivery setting of collar CO by the engine primary control has no effect on the peak pressure developed within the cylinder.

In accordance with the invention, secondary control check valve SV is provided in FIG. 3b, again with a smaller time constant than delivery valve DV, so that valve SV opens briefly during the pressure peak to spill back fuel to the supply, and it will be apparent that increasing engine speed causes greater impulses to valve SV, thereby spilling back more fuel. Because the magnitude of the pressure peaks does not tend to vary with the delivery setting, it is in general less necessary to use a cam to vary the spring loading on valve SV in FIG. 3b. However, the use of such a cam, in the same manner as in FIG. 3a, allows one to more easily tailor the secondary control valve spill-back amount to a given volumetric efficiency versus speed characteristic, and the use of such a cam with the pump of FIG. 3b is within the scope of the invention.

While FIG. 3b illustrates a reciprocating variable-delivery pump using a constant stroke length, its peak pressure characteristic is essentially the same as that of a number of reciprocating variable-delivery pumps in which the amount of fuel pumped per stroke is varied by varying the pump stroke length. In such pumps, the peak pressure ordinarily occurs at or near the beginning of the stroke, and the magnitude of the peak pressure does not vary appreciably with the fuel delivery or stroke length adjustment. It will be apparent that a secondary control check valve may be connected to the chamber of such a pump in the same manner as with the pump of FIG. 3b, with the check valve spring loading being either varied or not varied as a function of the primary control or stroke length setting.

Figure 1:
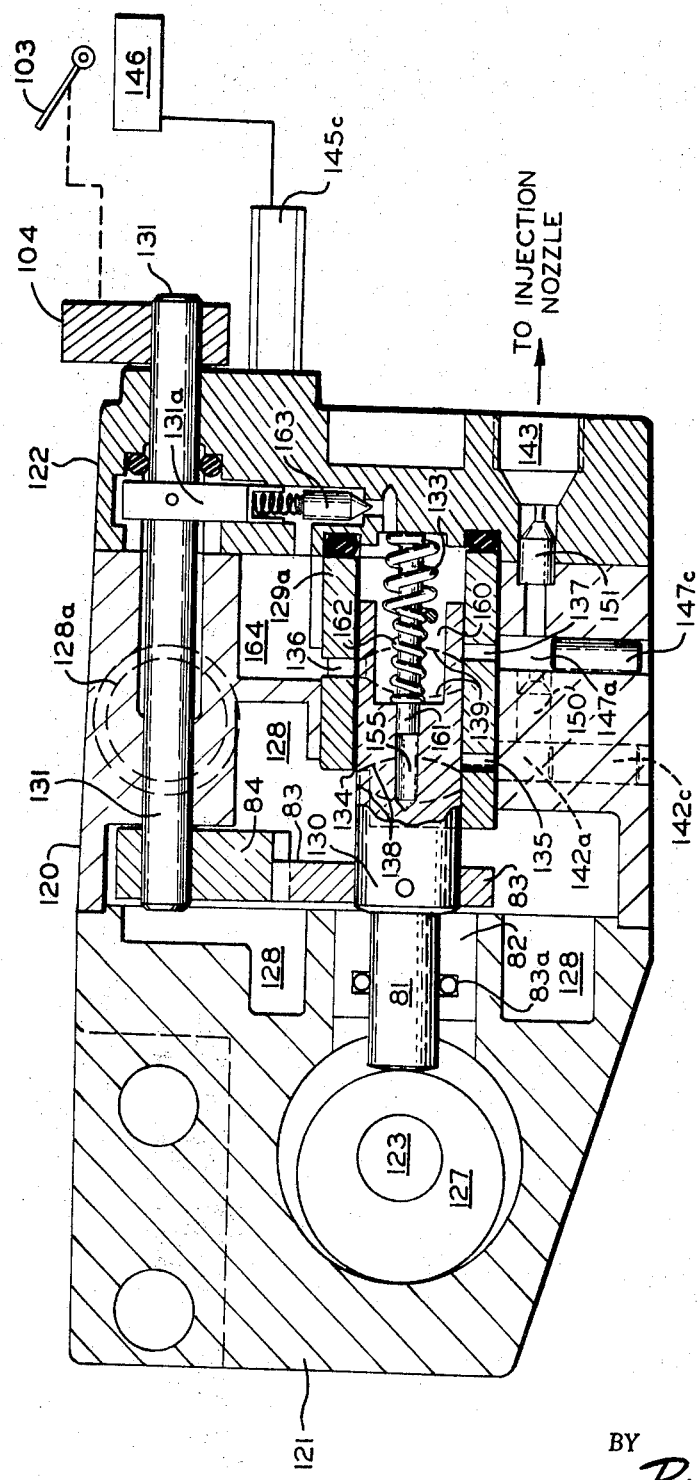
FIG. 1 is a cross-section view of a reciprocating variable-delivery pump of the type shown in my copending application modified to incorporates secondary control in accordance with the present invention.

FIG. 3c diagrammatically illustrates a third form of reciprocating variable delivery, constant stroke-length injection pump of a type shown in greater detail in FIG. 1 and also described in detail in my copending application. Piston P is reciprocated by the engine with some approximation of simple harmonic motion. A passageway within piston P communicates with the pump chamber and selectively communicates with inlet port IP and outlet port OP. The passageway edge positions vary angularly about the piston so that rotation of the piston varies the time during a given stroke at which inlet port IP is closed off and the time at which outlet port OP is opened, thereby varying the amount of fluid pumped during a rightward pumping stroke. The engine primary control rotatably adjusts piston P to vary pump delivery rate. At the leftward position of the piston inlet port IP is fully opened, and at the rightward end of the pumping stroke outlet port OP is fully opened. The passageway geometry is arranged relative to the two ports so that outlet port OP always opens slightly before inlet port IP is completely closed off at any angular position of the piston. With inlet port IP closing as outlet port OP is opening, the maximum restriction to flow from the pump cylinder occurs during the overlap condition when both ports are slightly open.

Consider initially the operation of the pump of FIG. 3c without secondary control check valve SV. As the piston begins a rightward pumping stroke, fluid is expelled through fully open inlet port IP, and the pressure within the pump cylinder remains low. As the inlet port begins to close off and the maximum flow restriction condition is approached, the pressure in the pump cylinder increases very rapidly, and then as the maximum restriction overlap condition is passed and outlet port OP is opened wider, the pressure decreases. The magnitude of the peak pressure developed in the cylinder will be seen to depend upon both engine speed, which determines the flow rate out of the pump cylinder, and upon the minimum total open area of the two ports when both are slightly open. As the piston is rotated to vary the delivery, it will be seen that the time during the stroke at which the maximum restriction condition occurs will vary, and if the same maximum restriction condition occurs at different piston velocities, which provide different flow rates from the cylinder, it may be seen that the peak pressure obtained will also vary with the engine primary control setting. If the same maximum restriction condition, i.e., same minimum open area during overlap, is made to occur for all delivery settings, the peak pressure at a given engine speed will be seen to be obtained if the maximum restriction condition occurs substantially at midstroke, when piston linear velocity is greatest, so that the peak pressure for a given engine speed will occur when the pump is adjusted to pump approximately one-half of its maximum delivery per stroke.

In accordance with the invention, secondary control check valve SV is connected from the pump cylinder to spill fuel during the occurrence of the pressure peaks. One advantage of the pump of FIG. 3c over those of FIGS. 3a and 3b is that the delivery check valve DV may be very lightly loaded, since delivery cannot begin until output port OP is opened, irrespective of pump speed and delivery setting. Furthermore, while the peak pressure impulse developed in the pumps of FIGS. 3a and 3b and applied to their secondary control check valves is limited by the opening of their delivery check valves, the peak pressure developed in the pump of FIG.3c is substantially independent of the delivery check valve loading, and thus the secondary control check valve used in the arrangement of FIG. 3c need not have a shorter time constant than that of the delivery check valve or otherwise be adjusted relative to any other check valve.

The above description of FIG. 3c assumes that the same maximum restriction condition occurs during the overlap condition at all angular adjustments of the piston. By suitably shaping and/or slanting the edges of the parts relative to the piston passageway edges one can cause the area of the maximum restriction to vary as the piston is rotated to provide different delivery rates, and hence one can make the amplitude of pressure peaks occurring in the pump of FIG. 3c either more a function of, or less a function of, the delivery setting in whatever manner one choses. If the minimum port area occurring during overlap is caused to increase somewhat with delivery setting up to one-half of pump capacity thereby decreasing the maximum restriction with an increased delivery setting up to one-half pump capacity (and thereafter to decrease with increased delivery if more than one-half pump capacity is used) the magnitude of the pressure impulses will tend to vary less with delivery setting. If the minimum port area during overlap is caused to vary roughly as a sine-squared function with the delivery setting, it will be seen that the magnitude of the pressure peaks occurring at a given engine speed can be made theoretically independent of the delivery setting, so that no variation in check valve spring loading with delivery setting is necessary. Because the pump of FIG. 3a requires that the inlet port be fully closed, providing an infinite restriction at all delivery settings, the magnitude of the pressure impulses occurring in such a pump varies markedly in accordance with the delivery setting, since the delivery setting determines the time during the stroke, and hence the piston velocity at the time the restriction is imposed. The pump of FIG. 3c (and FIG. 1), by not providing an infinite restriction, but instead a controllable partial restriction, the minimum area of which can be made to vary with delivery setting, therefore has the marked advantage that the magnitude of the pressure impulses occurring at a given engine speed may be arranged to vary with delivery setting in accordance with any desired function, or if desired, arranged not to vary appreciably at all.

It has been shown that while the peak pressure developed during a pumping stroke at a given engine speed varies with primary control setting with the pump of FIG. 3a, with maximum pressure being developed when this pump is pumping at roughly one-half its maximum capacity, that the peak pressure developed in the pump of FIG. 3b tends to be largely independent of the primary control setting, and that the peak pressure developed at a given engine speed in the pump of FIG. 3c may or may not vary appreciably with delivery setting, depending upon whether its port geometry is arranged to provide a minimum restriction area which varies with delivery setting. The amount of fuel spilled back by the secondary control check valve of any of the three systems of FIGS. 3a, 3b and 3c varies with the peak pressure impulse applied to the check valve in a manner dependent upon the check valve passage geometry, as well as upon its inertia and spring loading.

FIG. 1 illustrates in a cross-section view a form of injector pump disclosed and described in detail in my copending application, with certain modifications made thereto in accordance with the present invention. The pump is of the basic type described above in connection with FIG. 3c, but shown adapted for two-cycle engine use to pump oil as well as fuel. The pump comprises a generally-cylindrical central casting 120 having a rear head 121 and a front head 122 bolted thereto by means of bolts (not shown), with a suitable gasket (not shown) preferably provided between each head and the central casting. Shaft 123 rotated by the engine crankshaft carries eccentric cam 127. Rotation of cam 127 reciprocates tappet 81, which is carried in bushing 82 with an O-ring seal 83a. The right end of tappet 81 bears against the left end of piston 130, which reciprocates within sleeve 129a. A spring 133, only a portion of which is shown, is inserted between head 122 and a right-end face of piston 130 and operates to return piston 130. A lower gear sector 83 pinned to piston 130 is engaged by upper gear sector 84 pinned to control shaft 131, so that rotation of shaft 131 angularly positions piston 130. Shaft 131 is angularly positioned by accelerator pedal or throttle control 103 via arm 104 and a suitable mechanical linkage shown merely as a dashed line. Upper gear sector 84 is axially wider than lower gear sector 83 so that the gear sectors remain enmeshed as sector 83 reciprocates with piston 130.

Oil is supplied from an oil supply tank (not shown) to chamber 128 via a check valve (not shown) and a pipe connection made at 128a on the side of central casting 120. Fuel is supplied to chamber 164 from fuel tank 146 via conduit 145c. Oil and fuel inlet ports are provided in sleeve 129a at 134 and 136, respectively, and oil and fuel outlet ports are provided at 135 and 137. Oil piston 161 is urged rightwardly against front head 122 by inner coil spring 162. Holes drilled in main casting 120 at 142a and 147a connect the outlet ports with longitudinally-extending passages in which check valves 150 and 151 are located, and plugs 142c, 147c close the ends of passages 142 and 147a. Check valves 150 and 151 at the outlet side of the injector pump each communicate with mixing chamber 143 provided in front head 122. Two V-shaped grooves are milled across the outer periphery of piston 30 as shown by dashed lines at 138 and 139. The bottom of V-groove 138 communicates with oil chamber 155 inside piston 130, and the bottom of V-groove 139 communicates with fuel chamber 160 situated to the right of piston 130 and partially within piston 130. At various axial positions of piston 130 V-groove 138 connects chamber 155 to only chamber 128 via oil inlet port 134, or to both inlet chamber 128 via inlet port 134 and to mixing chamber 143 via outlet port 135 and check valve 150, or to only mixing chamber 143 via outlet port 135 and check valve 150. At corresponding axial positions of piston 130, V-groove 139 connects fuel chamber 160 to only chamber 164 via inlet port 136, or to both chamber 164 via inlet port 136 and mixing chamber 143 via outlet port 137 and check valve 151, or to only mixing chamber 143 via outlet port 137 and check valve 151. Inlet ports 134 and 136 and outlet ports 135 and 137 each comprise an opening which extends partially around sleeve 129a, with each such slot having a uniform dimension measured in the axial direction of sleeve 129a.

The cutting of V-shaped grooves on the periphery of cylindrical piston 130 gives the grooves a width which varies with the angular position of the groove around the piston. As is described in greater detail in my copending application, varying the angular position of the piston within sleeve 129a by means of control shaft 131 varies the time during a given piston stroke at which the V-grooves will communicate with the outlet ports and the time at which the V-groove will be cut off from the inlet ports, and hence determines the amount of fuel and oil which the pump will pass to the mixing chamber during the piston stroke.

Piston 130 is shown at its leftmost position in FIG. 1. As piston 130 is urged rightwardly on a pumping stroke, at the beginning of the stroke V-groove 138 connects oil piston chamber 155 via inlet port 134 to chamber 128 so that oil within chamber 155 is expelled from chamber 155 back into chamber 128, and V-groove 139 connects fuel chamber 160 via inlet port 136 to fuel chamber 164, so that fuel is expelled from chamber 160 back into chamber 164. At an intermediate time during the stroke determined by the angular position of piston 130, the V-grooves first reach and unblock outlet ports 135 and 137 and then move out of communication with and block inlet ports 134 and 136. Provision of such an overlap condition with the outlet ports always slightly opening before the inlet ports are fully closed prevents damage due to fluid blockage. Thereafter during the rightward pumping stroke, as the inlet ports fully close and the outlet ports increasingly open, oil is expelled from chamber 155 via outlet port 135, and fuel is expelled from fuel chamber 160 via outlet port 137, and the fuel and oil mix in mixing chamber 143. The mixing chamber connects to a nozzle (not shown) which injects the fuel-oil mixture into the engine air intake duct. As mentioned in my prior application, the fuel and oil are not mixed in a mixing chamber in some applications, and instead, only the fuel is piped to the nozzle and the oil is pumped to various oil holes at desired lubrication points within the engine.

The basic pump of FIG. 1 and FIG. 3c differs markedly from many somewhat similar prior art fuel metering pumps in that an inlet port is closed and a separate outlet port is opened during a pumping stroke, while the prior art generally (e.g. FIGS. 3a and 3b) has left each pump chamber in constant communication with an outlet check valve during the entire pumping stroke, so that forward pumping past a prior art check valve occurs either immediately (FIG. 3b) or as soon as an inlet port is closed off to prevent return pumping (FIG. 3a). If the fluid supply has positive pressure, the check valve in such prior systems must be loaded to at least the same pressure in order to prevent forward pumping prior to complete closure of the inlet port. And even if the fluid supply is not pressurized, the pressure in the prior art pump chambers necessarily builds up prior to complete closure of their inlet ports, in amounts dependent upon pump speed and dependent upon the amount of restriction to return flow between the pump chamber and the fluid supply, with the amount of said restriction increasing from a basic amount to complete blockage as the inlet port is gradually closed off. If forward pumping is not to occur prior to complete closure of the inlet port, the check valve in the prior systems must be loaded to the highest such pressure which may occur prior to inlet port closure. The heavier check valve loading necessarily results in higher pressures in the pump chamber, thereby requiring a more precise piston-cylinder fit. In the pump of FIGS. 1 and 3a, forward pumping cannot occur prior to opening of an outlet port, irrespective of whether the supply is pressurized, and hence the instant at which forward pumping begins during a pumping stroke remains substantially independent of pump speed and outlet check valve loading, making the quantity of fluid delivered per stroke similarly independent of pump speed and check valve setting.

In accordance with the embodiment of the present invention illustrated in FIG. 1, fuel chamber 160 is connected to fuel inlet chamber 164 via a spring-loaded check valve 163, the spring loading of which is shown made variable as a function of control shaft 131 position, by means of cam 131a carried on control shaft 131. Rotation of control shaft 131, as by means of accelerator pedal 103 and arm 104, so as to rotate piston 130 to increase oil and fuel flow rates causes cam 131a to vary the spring loading on check valve 163. The precise shape of cam 131a will depend upon the desired variation of fuel-air ratio, the variation in air flow with engine speed due to the engine air intake structure, the variation of pump cylinder peak pressure with engine speed, the variation of pump cylinder pressure with delivery setting, and the variation in the amount of fuel spilled back through check valve 163 with peak pressure, all of which determine the variation in the amount of fuel spilled back for a given engine speed with a given primary control delivery setting. In some embodiments of the invention, the spring loading of check valve 163 need not be varied as a function of throttle position. In those embodiments cam 131a may be eliminated and check valve 163 held in position with a fixed spring loading by a plug in head 122. The passageway which includes check valve 163 extends generally in a direction so as to intersect shaft 131 if cam 131a is used. If no cam is used it will be apparent that the passageway may extend out radially in another direction, such as perpendicularly to the plane of FIG. 1.

In the pump of FIG. 1 the inlet and outlet ports are spaced relative to their respective V-grooves so that maximum restriction to flow from each V-groove occurs during the intermediate or overlap interval when each V-groove slightly communicates with both its inlet port and its outlet port. Therefore, the maximum pressure which occurs in pump cylinder 160 during a pumping stroke occurs during that intermediate or overlap interval when both inlet port 136 and outlet port 137 are both only slightly open, so that maximum restriction to flow from chamber 160 is provided, and the magnitude of that maximum pressure will be seen to vary with pump piston speed. The pressure in chamber 160 will be seen to drop from its maximum value as piston 130 thereafter continues to travel rightwardly and outlet port 137 is increasingly unblocked.

As was explained above in connection with FIG. 3c, the maximum peak pressure developed in the pump cylinder for any given engine speed tends to occur if the maximum restriction condition when both inlet and outlet ports are slightly open occurs when the piston has maximum linear velocity. Maximum piston velocity usually occurs somewhere near midstroke if an approximation of simple harmonic motion is used to reciprocate the piston, and adjustment of the pump to cause the two ports to overlap around midstroke causes the pump to operate at approximately one-half its maximum capacity. If one-half or less of the pump maximum capacity is sufficient to supply the maximum fuel requirements of the engine, the overlap will occur during the last half of the pumping stroke, and if the shape and spacing of ports 136 and 137 and V-groove 139 provide the same minimum area restriction as piston 130 is rotated to give different delivery rates, increasing the primary control setting to call for increased delivery will increase the peak pressure developed for a given engine speed and tend to increase the amount of fuel spilled back by the secondary control check valve 163, and in such an arrangement cam 163 may be shaped to provide an increase in check valve spring loading as the primary control setting is adjusted to provide greater fuel flow. If, on the other hand, the maximum fuel requirements of the engine require more than one-half pump capacity, so that forward pumping is sometimes required during the first half of the stroke, and the port and V-groove geometry again provides the same minimum area restriction at different angular positions of piston 130, the cam may be shaped to increase check valve spring loading until the primary control is adjusted to the midstroke overlap condition, and thereafter to decrease the spring loading as greater amounts of fuel are called for. However, if rotation of piston 130 is arranged to vary the minimum area of the maximum restriction which occurs during the overlap condition, the maximum pressure developed in cylinder 160 can be made to vary directly with delivery setting, or not to vary appreciably with delivery setting, or even to vary inversely with delivery setting, if desired. If the maximum pressure does not vary appreciably with delivery setting, it will be apparent that variation of the spring loading on check valve 163 becomes unnecessary.

Figure 1B:
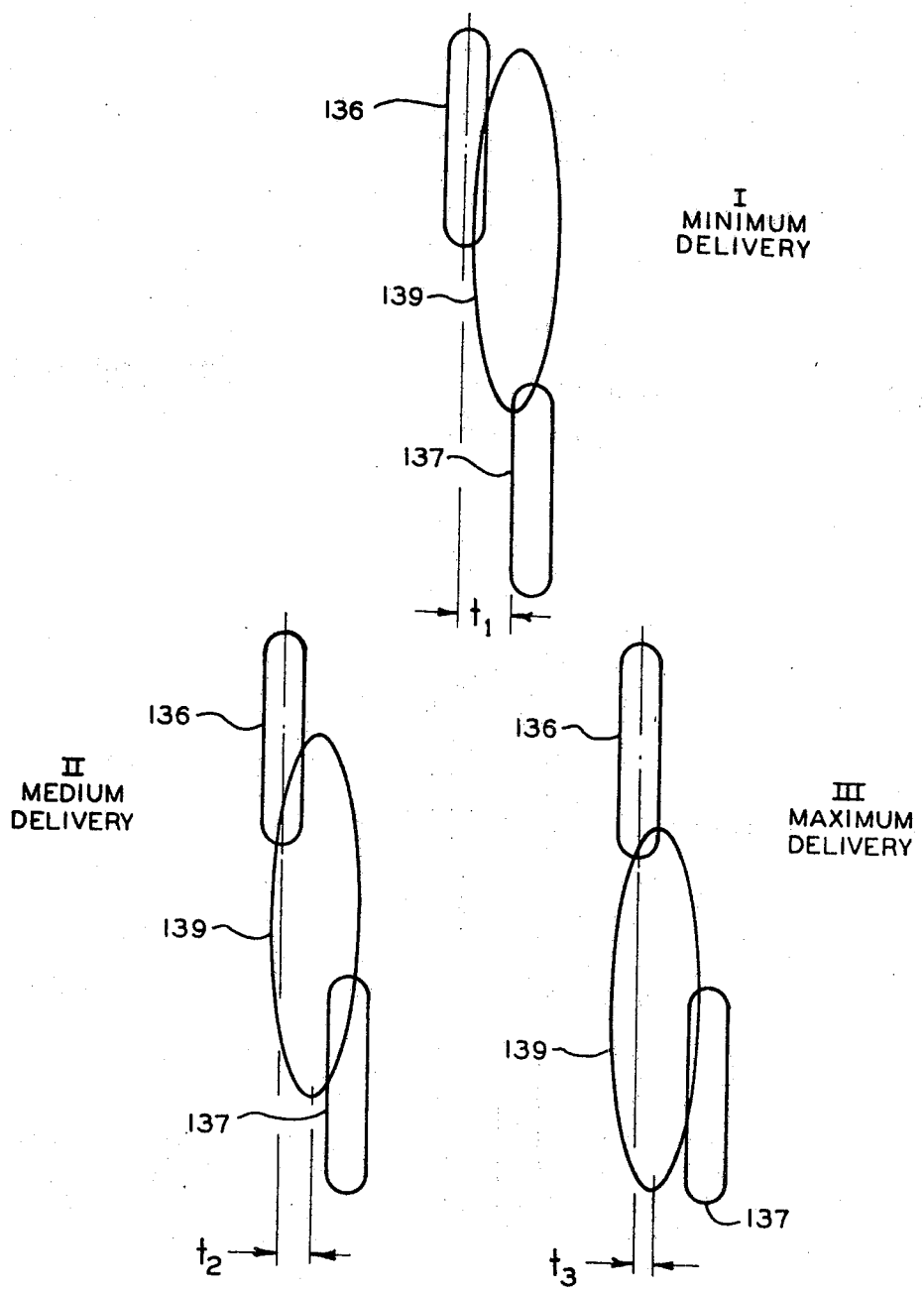
FIG. 1b is a porting diagram useful in understanding the operation of the pump of FIG. 1.

FIG. 1b contains three unrolled or developed views illustrating the geometry of V-groove 139 relative to ports 136 and 137. Angular adjustment of piston 130 to provide different delivery rates amounts to vertical displacement of the V-groove in FIG. 1b relative to the ports. On each pumping stroke V-groove 139 moves rightwardly relative to the ports from a beginning position in which the V-groove is centered on the inlet port 136. V-groove 139 is shown at I in a minimum delivery position at the time during the overlap condition when it least registers with inlet port 136 and outlet port 137, at II in a medium delivery position at the time during the overlap condition when it least registers with the ports, and at III in a maximum delivery position at the time when it least registers with the ports. It will be seen that the minimum overlap area varies from a small area in I, to a larger area in II, and then to a smaller area at III. Times $t_1$, $t_2$ and $t_3$ indicate the times after the beginning of the pumping stroke at which the maximum restriction occurs under the three different delivery conditions. Thus it will be seen that the amount of maximum restriction varies from a minimum at low delivery rates up to a maximum at approximately one-half capacity, down to a minimum at maximum delivery. Since piston speed at the time of the overlap condition varies in approximately the same manner, it will be apparent that the variation in restriction may be used to offset the variation in piston speed at the time of overlap, so that the magnitude of the pressure impulses developed at a given engine speed tends to be largely independent of the pump delivery setting.

If cam 131a is eliminated and a constant spring load is used on check valve 163, and if the port geometry provides the same minimum restriction at different delivery settings, the amount of fuel spilled back through the check valve at a given engine speed will increase with the primary control delivery setting as the primary control is varied from minimum flow to one-half pump capacity, thereby leaning out the fuel-air ratio, and as the primary control delivery setting is further advanced at the same engine speed to provide greater flow than one-half pump capacity, the amount of fuel spilled back through the check valve will decrease, thereby providing an increasingly-enriched mixture at increasing delivery settings.

In the arrangement shown in FIG. 1, wherein increasing fuel spill-back occurs at increasing engine speeds due to light load conditions but no comparable oil spill-back occurs it will be seen that the amount of oil pumped per stroke remains substantially constant, thereby providing larger oil-to-fuel and oil-to-air ratios during higher speed-lighter load conditions. Such operation is wholly satisfactory for many two-cycle engine applications, and particularly in those two-cycle engine applications where the oil is not mixed with the fuel but instead pumped to various lubrication joints within the engine.

If desired, the oil-to-fuel and oil-to-air ratios may be tailored by providing a secondary control oil check valve in similar fashion to spill back oil in amounts varying with engine speed.

While FIG. 1 illustrates a system which dispenses metered amounts of oil as well as fuel, such as is used with two-cycle engine systems, it is important to recognize that the invention is in no way restricted to fuel injection systems which dispense two fluids, and is quite as applicable to four-cycle engine ssytems wherein oil is not injected into the engine.

While the mixing and metering pump of FIG. 1 uses separate oil and fuel pistons (161 and 130) to pump oil and fuel with a desired ratio, an alternative embodiment shown in FIG. 1a dispenses with the need for a separate oil piston, and the need for V-groove 138 on piston 130 and the need for oil inlet and outlet ports 134 and 135 in sleeve 129a. In FIG. 1a oil is supplied to oil chamber 128 via an inlet conduit 128a which carries duckbill check valve 601. As cam 127 moves fuel piston 130 on a rightward fuel-pumping stroke, thereby increasing the volume of chamber 128, oil is drawn into chamber 128 through check valve 601. As spring 133 moves piston 130 leftwardly, thereby decreasing the volume of chamber 128, oil is expelled past oil outlet check valve 150 to mixing chamber 143. The amount of oil which is drawn into chamber 128 during a right ward stroke and dispensed to the mixing chamber on the piston return stroke depends upon the cross-sectional area of piston 130 times the length of the piston stroke, less the cross-sectional area of tappet 81 times the same stroke length, since tappet 81 increasingly enters chamber 128 from bushing 82 as piston 130 increasingly leaves chamber 128. If tappet 81 is very slightly less in diameter than piston 130, very little oil will be pumped compared to the amount of fuel pumped. It will be seen that a constant amount of oil will be pumped per stroke, irrespective of the adjustment of control shaft 131. In a variety of systems, and in particular those which drive constant loads, it is considered unnecessary to maintain a constant fuel-oil mixture ratio. The pump in FIG. 1a is shown without the cam 131a and check valve 163 utilized in FIG. 1 to provide secondary control, and such a feature obviously can be added to FIG. 1a, if desired.

The pressure-responsive secondary control concept of the present invention is not limited to use with reciprocating fuel injection pumps, and is also applicable to rotary fuel injection pumps of the type which incorporate distributors to distribute fuel to different engine cylinders. FIGS. 2a and 2b illustrate an application of the invention to a rotary fuel injection pump and distributor device of a basic type shown in my prior U.S. Pat. No. 3,057,300.

The pump includes a main casting 201 and a head 202 bolted to casting 201 by means of bolts 203, 203. Main casting 201 includes a cylindrical bore along axis x—x having three different diameters indicated at 206a, 206b and 206c. Drive shaft 207 extends through the bore, being journalled in portion 206a of the bore by means of bearings 208a, 208b. Seal retainer washer 210 and seal 211 seal the outer end of shaft 207, and ring 212 carrying seal 213 and rubber O-ring 214 seal shaft 207 adjacent bearing 208a. Aligning pin 201a seats in bores in casting 201 and head 202, and passes through slots in ring 234 and plate 225, thereby angularly fixing these parts relative to each other. Ring 212 is stationary, and cam 227 is attached to shaft 207 and rotatable therewith. Plate 232 is capable of limited angular adjustment about axis x—x by means of control rod 204, which is reciprocated by adjustments of the engine primary control (not shown). Spacer ring 246 having a slightly greater axial thickness than plate 232 surrounds plate 232 and is angularly held by pin 201a. Provision of spacer ring 246 transmits the force of disc spring 221 from ring 234 to head 202, so that plate 232 is not clamped tightly between head 202 and ring 234 and can be angularly adjusted easily.

A passageway 216a, 216b in casting 201 connects to the fuel supply (not shown), thereby admitting fuel to a ring-shaped chamber 217 formed by an annular groove around the external periphery of ring 212. A plurality of passages 218, 218 extend inwardly and axially in ring 212 to permit fuel to flow from chamber 217 through holes in ring 220. A dome-shaped spring cap or disc spring 221 retaining O-rings 222 and 223 urges plate 220 and ring 212 rightwardly in portion 206b of the cylindrical bore. Stationary plate 225, which is shown in detail in FIG. 2c is mounted against the back of disc spring 221. Plate 225 is provided with an oversize central bore greater than the diameter of shaft 207, provided with slot 224 to accommodate aligning pin 201a, and provided with six holes 225a–225f spaced in a circle sixty degrss from each other. The embodiment shown is designed for use with a six-cylinder engine, and other hole arrangements are provided in plate 225 for other types of engines. Four holes arranged at 90 degrees from each other would be used with a four-cylinder engine, for example.

The oversize central bores in disc spring 221 and fixed plate 225 permit fuel flow from chamber 217 through the holes in ring 212 and plate 220 to a ring-shaped chamber 226 formed by a cylindrical recess in rotatable cam 227, which is shown in greater detail in FIG. 2d. Cam 227 (FIG. 2d) includes two portions 227a, 227c of slightly different radius, with transition slopes 227b, 227d between the two portions. The two transition slopes are located 180 degrees around the cam from each other. The cam portion 227a of greater radius may be termed the cam lobe. As cam 227 rotates clockwise as viewed in FIG. 2d, slope 227b acts as the leading edge of lobe portion 227a, and slope 227d acts as the trailing edge of the lobe. Inlet passage 228 extends radially within cam 227 from chamber 226 and opens on the side of the cam at trailing edge 227d, and hence it will be seen that trailing edge 227d is in constant communication with the fuel supply.

Passage 230 extends inwardly within cam 227 from leading edge 227b to where it intersects outlet passage 231, an elongated radially-extending slot which also extends axially through the cam. With cam 227 mounted adjacent fixed plate 225, as shown in FIG. 2b, it will be seen that cam outlet slot 231 will successively register with individual ones of the six holes 225a–225f (FIG. 2c) in plate 225, and will not register with any hole in plate 225 at intermediate angular position between a pair of holes in plate 225.

As seen in FIGS. 2b and 2d, non-rotatable ring 234 surrounding cam 227 contains two circular holes 234a, 234b each opening into its circular central bore 234c, and two partially-circular crescent-shaped cam followers 235, 236 having the same axial length as ring 234 and cam 227 seat within holes 234a and 234b, respectively. Compression spring 237 carried in a bore in ring 234 urges follower 235 counterclockwise in recess 234a, and compression spring 238 similarly carried in ring 234 urges follower 236 counterclockwise in recess 234b, and hence edges 235a and 236a of the cam followers seat against the periphery of cam 227.

With cam 227 in the position shown in FIG. 2d, it will be seen that leading edge 227b and outlet slot 231 connect to a relatively large chamber boundary by edge 235a of follower 235 and edge 236a of follower 236, and that trailing edge 227d and inlet passage 228 of the cam connect to a relatively small chamber bounded by edge 236a of follower 236 and edge 235a of follower 235. The chamber containing trailing edge 227d will be smaller than the chamber containing leading edge 227b because of the greater size of cam lobe portion 227a as compared to cam recess portion 227c. As cam 227 rotates slightly more than 180 degrees from the position shown, thereby moving the cam lobe 227a to decrease the size of the initially larger upper chamber, it will be seen that fuel will be expelled through passage 230 and slot 231, and as cam lobe 227 moves out of the initially smaller lower chamber, it will be seen that fuel will be sucked into that chamber through inlet passage 228.

When cam 227 has rotated slightly more than 180 degrees from the position shown in FIG. 2d, leading edge or rise 227b of the cam lobe will rotate follower 236 clockwise against the force of compression spring 238, and trailing edge 227d will release follower 235, allowing its compression spring 237 to rotate follower 235 counterclockwise. Such movement of the cam followers, so that their edges 235b, 236b now seat against the cam, will be seen to re-establish a relatively large chamber in front of leading edge 227b and a relatively small chamber behind trailing edge 227d, so that the next half-revolution of the cam again expels fuel out through outlet passages 230 and 231 and again draws in fuel through inlet passage 228. Thus as drive shaft 207 continuously rotates cam 227, fuel is constantly drawn into passage 228 and expelled through slot 231. The pressure of the fuel in outlet slot 231 will be seen to vary as a function of pump speed. Also, it will be seen that the flow through passage 231 will be substantially constant throughout a complete revolution of the pump cam, except for momentary decreases twice during each revolution when cam followers 235, 236 are rotated. The cam followers are preferably located at an angular position around ring 234 so that the followers rotate at two times when cam slot 231 registers with a particular two of the six holes in plate 225, and then rotation of the cam followers will occur at a low differential pressure condition, when both cam inlet passage 228 and cam outlet passage 231 are connected to the supply.

As cam 227 rotates through a single revolution, slot 231 will be seen to pump fuel back to the supply through successive ones of the six holes in plate 225, and forward pumping out to an engine cylinder nozzle can occur only when slot 231 lies in between a pair of holes and does not register with any holes in plate 225. When cam slot 231 does not register with a hole in plate 225, fluid is pumped out of cam slot 231 leftwardly as viewed in FIG. 2b, and as fuel is pumped leftwardly out of slot 231, the proportion of the time it flows to an injection nozzle to the time it is returned to the supply, is governed by the adjustment of adjustable metering plate 232. Adjustable metering plate 232, as best seen in FIG. 2e, contains a central bore 232m to slidingly carry plate 232 on drive shaft 207 and allow limited angular rotation of plate 232 about axis x—x. Plate 232 is shown in phantom in FIG. 2a in place relative to shaft 207. Control rod 204 passing through bore 241 in casting 201 and fitted with a seal 242 is provided with a yoke end engaging plate 232 by means of cotter pin 243. As control rod 204 is adjusted by means of the engine primary control, plate 232 is angularly positioned about axis x—x relative to the holes in plate 225. Plate 232 is provided with six return pumping holes a through f arranged in a circle at one radius from axis x—x, and six forward pumping holes g through l arranged in another circle at a different radius, with the holes of the two circles angularly staggered, or out-of-phase with each other as shown. Outlet slot 231 of cam 227 is provided with a length so that it may partially register with holes of both circles as the cam rotates. The position of outlet slot 231 relative to plate 232 at one angular position of drive shaft 207 is shown in dashed lines at 231' in FIG. 2e. The width of cam slot 231 is chosen relative to the size and spacing of the holes in metering plate 232 so that slot 231 always registers at least slightly with either a return pumping hole of the inner circle or a forward pumping hole of the outer circle, and so that there is a slight overlap as the slot passes from a hole in one circle to a hole in the other circle. As cam 227 rotates the slot 231 will be seen first to register with inner hole d, then with both inner hole d and outer hole j, and then with outer hole j alone, and then with outer hole j and inner hole e, and then with inner hole e alone, etc. During the time that slot 231 does not register with a hole in plate 225, it will be seen that the pressure within slot 231 will vary in accordance with the restriction to flow out of slot 231 provided by plate 232. As slot 231 largely registers with one of return holes a–f the pressure in slot 231 will be very low, approaching the supply pressure. As slot 231 largely registers with one of delivery holes g–l the pressure will be somewhat higher due to the restriction of the nozzle and outlet passages. During the transition or overlap condition, however, as slot 231 transfers, from a delivery hole to a return hole, plate 232 will provide maximum restriction to flow from slot 231, thereby providing rapidly-rising pressure pulses within chamber 231. The variation of pressure in slot 231 with time for pump speed is illustrated by waveform L in FIG. 2f. The magnitude of the pressure pulses will be seen to vary as a function of pump speed, which determines flow rate in and out of slot 231, and with the amount of the maximum restriction occurring when slot 231 barely registers with one delivery hole and one return hole. If the slot 231 dimensions and the hole spacing in plates 232 are arranged to provide very little flow area during the overlap condition, it will be seen that the pressure in slot 231 will rise to a far greater value during such an overlap condition than at any other time during a revolution of the pump.

Head 202 pressed against adjustable metering plate 232 includes a cylindrical central recess 205 with which all of the inner circle return pumping holes a–f of plate 232 register, and bore 209 connects recess 205 back to the supply tank via chamber 215 and outlet 219. Head 202 also includes six outlet bores, 202a–202f, only one of which is shown in FIG. 2b, and each of which registers with a respective one of the forward-pumping holes g–l of plate 232, and each of which is angularly wider than the plate 232 hole with which it registers, so that each forward-pumping hole remains in substantial registry with a given outlet bore as plate 232 is adjustably rotated about axis x—x. Each outlet bore in head 202 connects via a suitable conduit to the injection nozzle of a respective engine cylinder.

As previously mentioned, when cam outlet slot 231 registers solely with a hole in plate 225, the fuel expelled from slot 231 all passes back to the supply via chamber 215 and outlet 219. If slot 231 simultaneously registers with a hole in plate 225 and with a delivery hole in plate 232, only return flow will occur because the outlet nozzles require more pressure to open than the supply pressure. Injection nozzles having a finite opening pressure are necessary. During the period cam outlet slot 231 does not register with a slot in plate 225, the fuel expelled leftwardly (in FIG. 2b) from slot 231 will pass through one of the forward-pumping holes g–m in plate 232 if slot 231 simultaneously registers with such a hole, but will instead pass through one of the return-pumping holes a–f in plate 232 if slot 231 instead simultaneously registers with such a hole. Angularly adjusting the position of metering plate 232 will be seen to adjust the proportion of the time in which the leftward flow (in FIG. 2a) through cam slot 231 is supplied to an outlet bore and injection nozzle to the time in which it is returned to the supply via recess 205 and outlet 219. If plate 232 is adjusted so that the holes in stationary plate 225 and the forward-pumping holes g–m in plate 232 are precisely "in phase," little or no fuel will be delivered to the nozzles, while adjustment of plate 232 to put the mentioned holes in the two plates substantially completely out-of-phase will result in maximum delivery to the nozzles. In practice, the sizes of the holes in plates 225 and 232 are selected relative to the dimensions of cam slot 231 so that passage 231 always registers with either a hole in plate 225 or a hole in plate 232 with at least a slight overlap, at any angular adjustment of plate 232. This slight overlap, and that provided as cam slot 231 engages successive holes in plate 232, are both provided in order to prevent complete blockage of fluid and damage to the pump. The use of spring disc 221 also can prevent pump damage from fluid blockage by allowing plates 225 and ring 234 to separate and release fluid to chamber 215.

How the adjustment of the angular phase or position of plate 232 relative to fixed plate 225 varies the fuel delivered to the nozzles may be better understood by reference to the timing diagram of FIG. 2f. Line A represents the flow provided into outlet passage 231 of cam 227, and the downward spikes represent the interruption of flow as the cam followers rotate. The line B represents plate 225, and the open spaces in the line represent the holes in plate 225. The lower excursions of line C represent the times when return flow occurs through a hole in plate 225. The lower excursions in line C extend through greater angular ranges than the openings in plate 225 because slot 231 has a finite width. The upper excursions in line C represent the time that fuel flows leftwardly (in FIG. 2a) from cam slot 231 through metering plate 232. Lines D, E, F and G relate to one adjustment of plate 232, while lines H, I, J and K relate to a different adjustment of plate 232. The open spaces in line D represent delivery holes g through l in plate 232, while the open spaces in line E represent the return holes a through f in plate 232. In the condition illustrated by lines D through G, the forward-pumping holes g through l are substantially completely out-of-phase with the holes in plate 225, and hence flow occurs through holes g through l at the times shown by the upper levels of line F. Conversely, return holes a through f of plate 232 are substantially in phase with the holes in plate 225, and little or no return flow occurs through holes a–f. If cam slot 231 slightly registers with a return hole before completely cutting off from a forward-pumping hole, return flow will exist for brief instants, as represented by the narrow spikes in line G.

Lines H and I similarly represent the holes in plate 232, but they are shown slightly shifted to the left in FIG. 2f to represent an advancing of plate 232, such as would occur by rotating plate 232 slightly counterclockwise as viewed in FIG. 2a. The forward pumping from cam slot 231 represented by line C now will be seen to be re-proportioned among the delivery holes and return holes in plate 232. The flow from cam slot 231 during time $T_1$ (see line C), for example, will be seen to pass initially through delivery hole $l$, but as slot 231 passes from hole $l$ to return hole $a$, the flow will be returned to the supply. The areas under the waveforms F and J represent the amount of fuel supplied to the nozzles, of course. Line L in FIG. 2f illustrates the pressure variation in cam slot 231 during the delivery conditions associated with lines H, I, J and K. The pressure will be seen to reach a maximum during the overlap conditions when slot 231 barely registers with both a return hole and a delivery hole in plate 232.

In order to provide secondary control, cam 227 is also provided with a spring-loaded check valve 241 within a passage which interconnects cam outlet slot 231 and inlet chambers 226, as seen in FIGS. 2d and 2g. The pressure impulse occurring in slot 231 (as shown in line L, FIG. 2f) as the slot transfers from registry with one of holes g–l to one of holes a–f briefly opens check valve 241 to return fuel to inlet chamber 226, and as increased pump speed provides increased pressure peaks, increasing amounts of fuel are spilled back from slot 231 to chamber 226, thereby decreasing the amount of fuel supplied to the injection nozzles and tending to maintain a more constant fuel-air ratio.

It may be noted that the pressure peaks occurring in cam slot 231 tend to act against the force of disc spring 221, to tend to force cam 227 and plate 225 rightwardly in FIG. 2b. If spring 221 were weak enough, secondary control could be obtained without check valve 241 by the leakage which would occur between cam 227 and plate 225 out to chamber 215 upon occurrence of the pressure peaks. However, because such movement of these larger parts is more difficult to control, the use of check valve 241 is preferred.

In FIG. 2d secondary control check valve 241 is shown situated in a bore which does not extend precisely perpendicular to its direction from axis x—x, so that centrifugal force tends to affect the operation of valve 241. When the operating axis of valve 241 is arranged with a radial component, centrifugal force will be seen to tend to either open or close valve 241, depending upon the angle of the valve axis. As shown in FIG. 2d increasing centrifugal force tends to open valve 241, thereby providing more fuel spill-back at increased engine speeds. So arranged, valve 241 may also act as an engine governor, preventing engine overspeed, by reducing fuel flow as the engine speed increases. If the operating axis of the check valve is substantially perpendicular to its direction from axis x—x, it will be seen that angular acceleration of cam 227 tends to close the valve with a force proportional to the inertia of the valve body, while deceleration tends to open the valve. If the valve body has substantial mass, engine acceleration and deceleration will be seen to decrease and increase fuel spillback, respectively, thereby automatically providing a desired variation in fuel-air ratio as the engine accelerates or decelerates. Provision of a valve body with substantial mass affects the response of the valve to the pressure impulses, however. A technique disclosed below in connection with FIG. 4a but also applicable to the device of FIGS. 2a and 2b allows one to utilize a check valve having a small mass together with a separate mass, so that acceleration variation of fuel-air ratio need not affect response of the check valve to the peak pressure impulses. The angle of the operating axis of the check valve will be seen to affect both the speed-limiting and acceleration variation functions of the check valve in an interdependent manner. For example, if the operating axis of the check valve extends purely radially, centrifugal force on the check valve will be maximized and the valve will be insensitive to engine acceleration and deceleration, while conversely, arranging the valve operating axis perpendicular to a radial will eliminate valve sensitivity to engine speed and maximize valve sensitivity to acceleration, and at other intermediate valve operating axis angles the valve will be influenced by both engine speed and engine accelerations.

The magnitudes of the pressure peaks developed in slot 231 of the device of FIGS. 2a and 2b vary as a function of pump speed, or engine speed, and do not vary appreciably with the delivery setting of metering plate 232 by the engine primary control, and hence it is wholly unnecessary in many applications to vary the secondary control check valve spring loading as a function of the primary control adjustment. In certain applications, however, such a variation of check valve spring loading is desirable in order to obtain a desired fuel-air mixture characteristic. A portion of an alternative embodiment of the invention in which the spring loading may be varied simply and accurately is illustrated in FIG. 2h.

Cam 227 in FIG. 2h is identical to cam 227 in FIGS. 2a and 2b except that check valve 241 and the passage between slot 231 and chamber 226 in which the check valve was located is omitted. In FIG. 2h two check valves 241a, 241b are instead fitted in bores in stationary ring 234, opening into the inner bore of ring 234 adjacent cam followers 235 and 236. The cam followers ride against cam 227 to establish two separate chambers around the cam, as previously described. During one-half revolution of cam 227 pressure builds up in the chamber in which the cam lobe is increasingly entering and suction builds up in the other chamber, and during the other half-revolution the situation is reversed. A pressure peak occurring in cam slot 231 also occurs in passage 230 and the chamber in which pressure builds up, of course. As engine speed increases, the pressure peaks occurring in the chamber to which check valve 241a is connected increasingly spill back fuel past valve 241a to chamber 215 at a brief instant occurring during one-half revolution of cam 227, and check valve 241b similarly spills back fuel at a brief instant during the other half-revolution thereby providing secondary control.

Check valves 241a and 241b may be backed with fixed springs (not shown) if it is not required that secondary control vary with primary control adjustment. If variation with primary control adjustment is desired, it will be apparent that the two cams (not shown) linked to the primary control may be used to vary the spring loading on springs in back of valves 241a, 241b. It is desirable that the amount of fuel spilled back for secondary control be the same for one-half revolution of the pump as for the other half revolutions, in order that more fuel not be supplied to three cylinders than to the other three cylinders, and if two separate cams are used to vary two separate check valve springs, it becomes difficult to make both check valves spill back the same amounts of fuel, due to tolerances in the cams and valve springs. FIG. 2h illustrates an improved arrangement in which the check valve bodies 241a, 241b are both urged inwardly by a scissors-spring device having two spring arms 251a, 251b pivotally connected together at 252. Rotation of cam 253 urges the upper ends of the spring arms increasingly apart, thereby increasing the spring loading on valves 241a, 241b. Since the spring arms float with respect to the pump housing and ring 234, it will be seen that the spring forces applied to the two valves are equal, thereby tending to equalize the amounts of fuel spilled back by the two check valves. Cam 253 is connected by a lever 254 to be rotated by control rod 204 as rod 204 is adjusted to adjust metering plate 232. In the device of FIG. 2h wherein the secondary check valve means is mounted in stationary ring 234, it will be apparent that with no centrifugal force on the valve, the valve cannot be used for speed-governing in addition to secondary control.

As previously mentioned, the device of FIGS. 2a and 2b requires the use of fuel injection nozzles having a substantial opening pressure, in order that fuel in cam slot 231 be returned via a hole in plate 225 rather than flowing to a nozzle when cam slot 231 simultaneously registers with a hole in plate 225 and one of holes g through l in metering plate 232. It is highly desirable in some applications to use injection nozzles having no substantial opening pressure, and highly desirable that the opening pressures of the various nozzles of a multi-cylinder engine not need to be matched. FIG. 4 illustrates a device generally similar to that of FIGS. 2a and 2b with certain differences which allow the use of injection nozzles having no substantial opening pressure, such as the improved elastomeric injection nozzle disclosed in my prior application. Parts in FIG. 4 similar to those in FIGS. 2a and 2b are given similar numerical designations.

Fuel flows from the supply passage 216a through plate 225 and into cam 227 in the same manner as in the previous embodiment, and pressure is developed in cam outlet slot 231 in the same manner. An additional fixed plate 328 is provided on the left side (FIG. 4) of cam 227. Plate 328 is substantially identical to plate 225 (shown in FIG. 2c), except that the six holes in plate 328 are rotated thirty degrees from those shown in FIG. 2c, so that the six holes in plate 328 are completely out-of-phase with the six holes in plate 225. Thus as cam 227 rotates fuel is expelled out of slot 231 either back through a hole in plate 225 or forwardly through a hole in plate 328. Slot 231 is provided with a width such that a small instant of overlap occurs as the slot passes from registration with a hole in one of the plates to registration with a hole in the other plate, and a pressure impulse occurs during such a transition.

Fixed to drive shaft 207 in between fixed plate 328 and adjustable metering plate 232 is a rotating distributor plate 370. Plate 370, as shown in FIG. 4a, includes a slot 372 preferably of the same dimensions as slot 231 of cam 227, and plate 370 is fastened to shaft 207 so that distributor slot 372 is precisely in phase with cam slot 231. Assume for the time being that only slot 372 is provided in FIG. 4a, without the passageway containing ball check valve 373, spring 374, weight 375 and spring 376. Spacer ring 346 in FIG. 4 is similar in function to ring 246 in FIGS. 2a and 2b, but provided with an axial width slightly greater than both distributor plate 370 and adjustable metering plate 232, thereby allowing the two latter parts to rotate about axis x—x. Adjustable metering plate 232 is shown in FIG. 2e.

When cam slot 231 is in registration with a hole in plate 328 and not with a hole in plate 225, fuel will be pumped through the hole in plate 328 to distributor slot 372. Distributor slot 372 scans across the twelve metering holes of plate 232 in FIG. 4 in the same manner in which cam slot 231 of FIGS. 2a and 2b scan across the holes of the metering plate 232, and hence fuel is either delivered to the nozzles or returned to the supply in proportions governed by the adjustment of plate 232, in the same manner as in FIGS. 2a and 2b. When cam slot 231 registers with a hole in plate 225 and does not register with a hole in plate 328, distributor slot 372, being in phase with cam slot 231, also will not register with a hole in plate 328, and hence flow between slots 231 and 272 cannot then occur, irrespective of the nozzle pressure relative to the supply pressure.

As distributor slot 372 transfers from registration with one of delivery holes g through l in plate 232 to the next return hole of the group a through f of plate 232, thereby passing through the maximum restriction condition, a pressure impulse will be developed in slot 372, and because slot 372 then communicates with cam slot 231 through a hole in plate 328, the pressure impulse will occur in both slots 372 and 231. Because the pressure impulses occur in both slots, a check valve responsive to the pressure peaks may be provided in either cam 227 or in distributor plate 370 in order to provide secondary control. Such a check valve may be provided in cam 227 in exactly the same manner as in the previous embodiment. If provided in distributor plate 370, as shown in FIG. 4a, the passage within which the valve is located need merely lead from slot 372 to the edge of plate 370, so that fuel pumped past the check valve will pass to chamber 215. If desired, check valve 373 in plate 370, or instead a similar check valve in cam 227, may be located in a bore which extends with a radial component of direction from axis x—x, so that centrifugal force will cause the check valve to perform a speed-limiting function as well as accomplishing secondary control, and if the valve operating axis extends with a non-radial component, as shown in FIG. 4a, engine acceleration and deceleration will modify the check valve operation so as to vary the fuel-air ratio. In FIG. 4a, ball check valve 373 comprises a small low-inertia check valve capable of responding rapidly to the peak pressure impulses, and weight 375 is provided to supply a substantial mass, so that the valve opening and closing will be substantially affected by engine acceleration and deceleration.

While the rotary variable-delivery distributing pumps of FIGS. 2a and 2b, 2h and 4 all utilize a rotary cam operating relative to stationary cam followers, similar pumps using a stationary cam and rotatable cam followers are also known, one form being shown in FIGS. 5-8 of my prior U.S. Pat. No. 3,057,300, and the invention is applicable as well to pumps of that further type, as is disclosed in FIGS. 5a through 5c of the present application. The pump includes a cylindrical cup 410 having a drive shaft 412 centrally journalled therein. Fixedly attached to shaft 412 to rotate therewith are rotor 430 and distributor disc 470. A stationary circular plate 414 is situated in the bottom of cup 410 and return holes 414a and 414b connect with passages 410a and 410b (only one of which is shown) extending through the bottom of cup 410, to where conduits (not shown) may return fuel to the supply source. Situated above plate 414 within cup 410 is stationary cam ring 422, which is provided with two portions a and c of different radius each extending almost halfway around the inner periphery of ring 422, and provided with short transition slopes b and d therebetween. Passage 452 extends from slope b to the outer periphery of ring 422 and connects with passage 453 (FIG. 5b) through cup 410, to which fuel inlet conduit 454 is connected. Cam ring 422 completely surrounds cam rotor 430. Rotor 430 is provided with two circular recesses 430a, 430b extending inwardly from the periphery of the rotor, and two partially-circular cam followers 418 and 420 seat within the two recesses. Compression springs (e.g. 451 in FIG. 5b) urge each cam follower clockwise as viewed in FIG. 5b. Stationary circular plate 428 covers cam ring 422, rotor 430, and followers 418 and 420, and is provided with two through slots 456a and 456b as shown in FIG. 5c. Cam followers 418 and 420 each include an inlet passageway 454 extending from their non-circular face to intersect with a through passageway 455, which extends from the bottom to the top of the cam follower, preferably at the center, or axis of rotation of the cam follower.

As cam rotor 430 rotates clockwise as viewed in FIG. 5b, with the trailing edge of follower 418 sweeping across portion c of ring 422 and the trailing edge of follower 420 sweeping across portion a of ring 422, the space into which inlet passage 452 opens will be seen to increase, thereby drawing in fuel behind follower 418. Simultaneously, the space ahead of follower 418 will be seen to decrease, thereby forcing fuel into outlet passage 455 of the follower. Upon further rotation of rotor 430, perhaps twenty degrees past the position shown in FIG. 5b, it will be seen that transition d will rotate follower 418 counter-clockwise and transition b will release the trailing edge of follower 420, allowing spring 451 to rotate follower 420 clockwise. Then as rotor 430 rotates through approximately 180 degrees back to its assumed original condition, the sweep of the trailing edge of follower 420 around portion c of the ring 422 will expel fuel through the vertical outlet passage 456 of follower 420. Thus fuel is alternately pumped through the two followers, being pumped at any given time by whichever follower is sweeping past portion c of the cam ring. As a given follower rotates past sector c of the cam ring its outlet passage scans across return slots 414a and 414b of ring 414, and across delivery slots 456a and 456b of plate 428. Return slots 414a, 414b are angularly staggered or out-of-phase from delivery slots 456a, 456b, but arranged so that a cam follower outlet passage (455 or 456) will bridge both a return slot and a delivery slot with a slight overlap as it passes from one to the other.

Distributor disc 470 is affixed to shaft 412 so that its slots 471, 472 are in phase with the outlet passages of followers 418, 420. As a cam follower registers with a delivery slot in plate 428, fuel passes through the distributor slot to angularly-adjustable metering plate 404. Inasmuch as distributor disc 470 and adjustable metering plate 404 function similarly to distributor 370 and plate 232 of FIG. 4, no detailed description of their operation is necessary. Slots 471 and 472 in distributor 470 are located at different radial distances from shaft 412. As the distributor rotates distributor slot 471 successively communicates with an inner ring of holes in metering plate 404, such as a delivery hole 402 and then a return hole 406, while slot 472 successively registers with holes in an outer ring, such as delivery hole 403 and return hole 407. The delivery holes may connect out to engine nozzles in the same manner as in previously-described embodiments. As a distributor slot transfers from registration with a delivery hole in plate 404 to the succeeding return hole in plate 404, a pressure impulse will be developed in the distributor slot, the slot in plate 428 with which it registers, within the cam follower then in registration with the delivery slot in plate 428, and within the chamber bounded by sector c of cam ring 422. In order to provide secondary control, a spring-loaded check valve 476 is provided within a passage 477 which extends from that chamber, preferably at cam transition d, through cam ring 422 and cup 410 to the supply. The pressure peaks will be understood to spill back fuel through check valve 476 to provide secondary control. Because the pressure peaks also occur within the distributor 470 slots 471 and 472, check valve 476 in stationary ring 422 may be omitted, if desired, and two secondary control check valves (not shown) may be arranged within distributor 470 to spill fuel from slots 471 and 472 to the supply. If provided in distributor 470, such check valves may be arranged to be responsive to speed and acceleration in accordance with the principles discussed above in connection with FIGS. 2a, 2b, 4 and 4a.

In each of the rotary pumps disclosed three main pumping conditions occur in a repetitive sequence, neglecting the transitions from one main condition to the other. In the device of FIGS. 2a and 2b the three conditions are (1) return pumping through a hole in plate 225, (2) *forward* pumping through one of holes g to l in plate 232, and (3) return pumping through one of holes a to f in plate 232. By simply interchanging the angular positions of the holes in plate 232, the sequence of the three conditions can be altered, so as to provide return pumping through a hole in plate 225, then return pumping through one of holes a to f, and then forward pumping through one of holes g to l. Using the first sequence, it may be seen that fuel injection to the engine will always begin at the same point during the engine cycle, and will end at different points during the engine cycle, depending upon the setting of the engine primary control. Conversely, using the second sequence, fuel injection will always terminate at the same point of the engine cycle, and will begin at different points dependent upon the primary control setting. In various different engine systems it is often advantageous to have the fuel injection either begin or end at times during the engine cycles which vary with the amount of fuel being delivered, and it will be seen that the rotary pump inventions advantageously may be arranged to function in either manner, whichever may be desired for a given engine.

It will be apparent at this point that the secondary control may be provided using a spring-loaded check valve in any engine system having a fuel injection system in which either the fuel injection pump or a distributor used therewith cyclically experiences a peak pressure impulse having a magnitude which varies as a function of engine skilled in the art that the main principles of the invention are readily applicable to systems using variable stroke length pumps, for example, as well as the specific pump types shown. A variety of modifications will occur to those skilled in the art. Various of the check valves shown as needle valves may comprise ball or poppet-type valves instead, for example.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Another important advantage of the rotary pumps of FIGS. 2a–2b, 2e, 4a and 5a–5c over the somewhat similar rotary pumps of my prior U.S. Pat. No. 3,057,300 is that fuel quantity in the pumps herein disclosed is controlled by adjustment of a substantially stationary, slightly rotatable metering plate, rather than by controlling the phase relationship of two rotating components, which latter relationship is inherently much more difficult to implement and which ordinarily requires more parts and a more complex mechanism, and a further object of the present invention is to achieve that advantage over the prior art.

The embodiments of the invention in which an exclusive property or privilege is claimed are defined as follows:

1. In a fuel injection system for an internal combustion engine having an air intake structure and having a volumetric efficiency which varies with engine speed, a variable-delivery fuel injection pump means cyclically driven by said engine through delivery and non-delivery portions of successive pump cycles and connected to supply metered amounts of fuel from a fuel supply to said engine during said delivery portions of said pump cycles, said pump means having a chamber in which pressure impulses having magnitudes commensurate with a function of engine speed occur during said delivery portions of said pump cycles as said pump means is driven by said engine, and first control means for varying said metered amounts of fuel supplied to said engine during operation of said pump means and engine, the combination of pressure-responsive check valve means connected to said chamber to be opened by said pressure impulses at the instants during said delivery portions when said magnitudes exceed a finite predetermined value to divert fuel from said chamber to decrease the metered amounts of fuel supplied to said engine, and to be closed at the instants during said delivery portions when said magnitudes are less than said predetermined value, the opening pressure of said check valve means being selected in accordance with the volumetric efficiency versus speed characteristic of said engine, thereby to lessen the tendency for the ratio of fuel to air supplied to said engine to increase as engine speed increases due to a decrease in engine load conditions.

2. The combination according to claim 1 in which said pump means is connected to supply said fuel to said engine through a second check valve means.

3. The combination according to claim 1 in which said fuel injection pump means comprises a piston adapted to reciprocate a fixed stroke length within said chamber.

4. The combination according to claim 1 in which said pump means is connected to supply said fuel to said engine through a second check valve means connected to said chamber and includes a piston adapted to reciprocate with a fixed stroke length within said chamber.

5. The combination according to claim 1 in which said chamber of said pump means includes an inlet port connected to said fuel supply and an outlet port connected to supply said metered amounts of fuel to said engine, in which said pump means includes a piston having a passage communicating with said chamber and adapted to communicate successively with said inlet port and not said outlet port and then with said outlet port and not said inlet port as said piston travels on a delivery stroke, and in which said first control means of said system includes means for varying the point during a stroke at which said passage of said piston changes from communication with said inlet port to outlet port.

6. The combination according to claim 1 in which said pump means includes means for supplying fuel at a substantially constant rate to said chamber, a rotatable plate in which said chamber is situated, and a second plate adjacent one side of said rotatable plate, said chamber having an open end adjacent said second plate and said second plate having first and second holes, whereby said end of said chamber successively communicates with said holes as said rotatable plate rotates, one of said holes being connected to said fuel supply and the other of said holes being connected to supply said metered amounts of fuel to said engine, said first and second holes being spaced in said second plate so that said end of said chamber encounters maximum restriction to flow from said chamber and provides one of said pressure impulses as said chamber transfers from communication with one of said holes to the other of said holes.

7. The combination according to claim 1 in which said pump means includes a rotatable part within which said chamber is situated, said rotatable part being connected to rotate at a speed proportional to engine speed and having a bore within which said check valve is situated to determine the direction of motion of said check valve, said check valve comprising a valve body and spring means urging said valve body in the direction of said bore.

8. The combination according to claim 1 having control means for varying the proportion of time during each pump cycle during which fuel is expelled from said chamber in order to vary the amount of fuel supplied to said engine.

9. The combination according to claim 1 in which said chamber includes an inlet port and an outlet port, and in which said system includes control means for varying the point during each pumping cycle at which expulsion of fuel from said chamber to said fuel supply through said inlet port is terminated and the time during each pumping cycle at which expulsion of fuel from said chamber to said engine through said outlet port is initiated.

10. The combination according to claim 1 in which said pump means includes a second chamber in which pressure impulses having magnitudes commensurate with a function of engine speed cyclically occur as said pump is driven by said engine, and a second spring-loaded check valve means connected to said second chamber to be cyclically opened by said pressure impulses occurring in said second chamber to divert fuel from said second chamber.

11. The combination according to claim 1 in which said pump means includes means for supplying fuel at a substantially constant rate to said chamber, said pump means including a rotatable plate within which said chamber is situated, second and third stationary plates situated adjacent opposite sides of said rotatable plate, said second and third plate each having an opening, said chamber having two open ends which successively communicate with the openings in said second and third plates as said rotatable plate rotates, the openings in said second and third plates being staggered so that said chamber decreasinly communicates with said opening in said second plate while increasingly communicating with said openng in said third plate and thereby encounters maximum restriction to flow from said chamber as said chamber passes from communication with said opening in said second plate to communication with said opening in said third plate and thereby develops said pressure impulses.

12. The combination according to claim 1 in which said pump means is connected to supply said fuel to said engine through nozzle means.

13. The combination according to claim 1 having means responsive to adjustment of said first control means for varying said predetermined value of pressure magnitude at which said check valve means opens.

14. The combination according to claim 1 in which said pressure-responsive check valve means comprises a spring-loaded check valve having a spring-loading which is maintained constant as said engine speed and load conditions vary.

15. The combination according to claim 4 in which said chamber includes a port past which said piston reciprocates and in which said system includes control means for varying the point during a stroke at which said piston closes said port.

16. The combination according to claim 4 in which said piston includes a movable port reciprocable relative to a fixed port in said pump means and in which said system includes control means for varying the point during a stroke at which said movable port registers with said fixed port.

17. The combination according to claim 4 in which said spring-loaded check valve means has a smaller inertia to spring-force ratio than said second check valve means.

18. The combination according to claim 4 in which said spring-loaded check valve means has a greater steady-state opening pressure than that of said second check valve means.

19. The combination according to claim 5 in which said ports are arranged so that said passage of said piston communicates decreasingly with said one of said ports and increasingly with the other of said ports simultaneously as said passage changes from communication from said one to said other of said ports, thereby providing a maximum restriction to flow from said chamber.

20. The combination according to claim 6 having a third plate adjacent the opposite side of said rotatable plate, said third plate having a third hole and said chamber having a second open end which cyclically communicates with said third hole as said rotatable plate rotates, said third hole being connected to said fuel supply.

21. The combination according to claim 7 in which the direction of said bore is arranged substantially perpendicularly to a radial line between the axis of rotation of said rotatable part and said valve body, whereby centrifugal force acting on said valve body as said part rotates does not tend to affect the opening pressure of said check valve.

22. The combination according to claim 7 in which the direction of said bore is arranged non-perpendicularly to a radial line between the axis of rotation of said rotatable part and said valve body, whereby centrifugal force acting on said valve body as said part rotates tends to affect the opening pressure of said check valve.

23. The combination according to claim 7 in which the direction of said bore has a substantially non-radial component, whereby the inertia force acting on said valve body due to angular acceleration of said rotatable part tends to affect the opening pressure of said check valve.

24. The combinaion according to claim 7 in which the direction of said bore has a substantially non-radial component, a weight slidingly movable within said bore, and spring means interposed between said valve body and said weight, whereby the inertia force acting on said valve body and said weight due to angular acceleration of said rotatable part tends to affect the opening pressure of said check valve.

25. The combination according to claim 7 in which said bore extends at an acute angle to a radial line between the axis of rotation of said rotatable part and said valve body, whereby both the speed of rotation and the angular acceleration of said rotatable part substantially affect the opening pressure of said check valve.

26. The combination according to claim 8 in which each pump cycle comprises a pumping stroke and a suction stroke, and in which said control means comprises means for varying the point during each pumping stroke at which expulsion of fuel from said chamber to said engine is initiated.

27. The combination according to claim 8 in which each pump cycle comprises a pumping stroke and a suction stroke, and in which said control means comprises means for varying the point during each pumping stroke at which expulsion of fuel from said chamber to said engine is terminated.

28. The combination according to claim 10 including floating spring means having two opposite ends acting on said check valve means to apply the same spring force to both check valve means.

29. The combination according to claim 19 in which said ports are arranged relative to said passage of said piston so that varying the time during a stroke at which said passage of said piston changes from communication with said one of said ports to said other of said ports varies the amount of said maximum restriction to flow from said chamber.

30. The combination according to claim 13 in which said means for varying said value of pressure magnitude is operative to increase the loading of said check valve means as said control means increases the amount of fuel supplied by said pump means to the engine up to a predetermined amount and to thereafter decerase said loading as said control means further increases the amount of fuel to an amount greater than the predetermined amount.

31. The combination according to claim 13 in which said means for varying said value of pressure magnitude of said check valve means is operative to increase the loading of said check valve means as said control means increases the amount of fuel supplied by said pump means to the engine.

References Cited

UNITED STATES PATENTS

| | | | |
|---|---|---|---|
| 654,140 | 7/1900 | Diesel | 123—139.3 |
| 1,263,839 | 4/1918 | Barford | 123—139.4 |
| 1,854,009 | 4/1932 | Wilkinson | 123—139.4 |
| 1,966,694 | 7/1934 | Vaudet et al. | 123—139.3 |
| 2,019,650 | 11/1935 | Bischof | 123—139.5 |
| 2,225,019 | 12/1940 | Retel | 123—139.3 |
| 2,254,441 | 9/1941 | Muller et al. | 123—139.3 |
| 2,696,807 | 12/1954 | Junge et al. | 123—139.3 |
| 1,625,739 | 4/1927 | Olsen | 123—139.6 |
| 1,974,851 | 9/1934 | Hurst | 123—139.6 |

FOREIGN PATENTS

| | | | |
|---|---|---|---|
| 413,475 | 7/1934 | Great Britain | 123—139.6 |

WENDELL E. BURNS, Primary Examiner

U.S. Cl. X.R.

123—139 AB, 139 AC, 139 AR, 139 AD, 139 AE, 139 AF, 139 AW, 140 A